US012405012B2

(12) United States Patent
Hokanson et al.

(10) Patent No.: US 12,405,012 B2
(45) Date of Patent: Sep. 2, 2025

(54) APPARATUS AND METHOD FOR SOLAR HEAT COLLECTION

(71) Applicant: D & M Roofing Company, Fargo, ND (US)

(72) Inventors: Daniel S. Hokanson, Fargo, ND (US); Greg M. Smith, Sabin, MN (US)

(73) Assignee: Lasting Image Laser Etching Company, Fargo, ND (US)

( * ) Notice: Subject to any disclaimer, the term of this patent is extended or adjusted under 35 U.S.C. 154(b) by 699 days.

(21) Appl. No.: 16/928,713

(22) Filed: Jul. 14, 2020

(65) Prior Publication Data

US 2021/0018184 A1   Jan. 21, 2021

Related U.S. Application Data

(60) Provisional application No. 62/874,345, filed on Jul. 15, 2019.

(51) Int. Cl.
    *F24D 11/00*    (2022.01)
    *C04B 28/04*    (2006.01)
    (Continued)

(52) U.S. Cl.
    CPC ............ *F24D 11/003* (2013.01); *C04B 28/04* (2013.01); *F24S 50/40* (2018.05); *F28F 13/185* (2013.01)

(58) Field of Classification Search
    None
    See application file for complete search history.

(56) References Cited

U.S. PATENT DOCUMENTS

| 4,000,851 A * | 1/1977 | Heilemann ........... F24S 10/742 |
| | | 126/633 |
| 4,127,161 A * | 11/1978 | Clyne .................... F28D 20/02 |
| | | 165/104.31 |

(Continued)

FOREIGN PATENT DOCUMENTS

| WO | WO2010/041961 A1 | 4/2010 |
| WO | WO2012/039662 A1 | 3/2012 |

OTHER PUBLICATIONS

Zhai et al., Scalable-manufactured randomized glass-polymer hybrid metamaterial for daytime radiative cooling, Science 335, 1062-1066, Mar. 10, 2017.

(Continued)

*Primary Examiner* — Edelmira Bosques
*Assistant Examiner* — Deepak A Deean
(74) *Attorney, Agent, or Firm* — Charles A. Lemaire; Lemaire Patent Law Firm, P.L.L.C.

(57) ABSTRACT

Subterranean thermal capacitance for an environmental-control apparatus mechanized via a solar thermal system. The method and apparatus use a solar collector and a plurality of heating-energy-storage cells that are each thermally insulated from one another, wherein heating energy-transfer fluid (HETF) coming from the solar collector is transferred to the energy-storage cell having the highest temperature that is greater than the temperature of the HETF, in order to segregate energy-storage cells to more efficiently store heating energy. Some embodiments further include an energy radiator that radiates thermal energy to an environment and thereby cools a cooling-energy-transfer fluid (CETF) and a plurality of cooling-energy-storage cells that are each thermally insulated from one another, wherein the CETF coming from the energy radiator is transferred to the cooling-energy-storage cell having the lowest temperature (Continued)

that is lower than the temperature of the ETF, in order to segregate cooling-energy-storage cells to more efficiently store cooling energy.

30 Claims, 7 Drawing Sheets

(51) Int. Cl.
*F24S 50/40* (2018.01)
*F28F 13/18* (2006.01)

(56) References Cited

U.S. PATENT DOCUMENTS

| | | | | |
|---|---|---|---|---|
| 4,237,965 A * | 12/1980 | Hay | ............... | F24S 20/67 261/153 |
| 4,268,558 A * | 5/1981 | Boardman | ............... | F24C 15/34 165/47 |
| 4,291,674 A * | 9/1981 | Comte | ............... | F24S 50/80 47/17 |
| 4,321,962 A | 3/1982 | Doty | | |
| 4,344,414 A * | 8/1982 | Balch | ............... | F28D 20/0052 165/45 |
| 4,402,188 A * | 9/1983 | Skala | ............... | F24D 11/02 62/238.7 |
| 4,408,596 A * | 10/1983 | Worf | ............... | F24S 20/66 126/633 |
| 4,750,543 A * | 6/1988 | Edelstein | ............... | F28D 15/043 126/645 |
| 5,048,507 A * | 9/1991 | Ridett | ............... | F24D 11/0221 126/633 |
| 5,445,213 A * | 8/1995 | Im | ............... | F25D 16/00 165/10 |
| 5,758,463 A * | 6/1998 | Mancini, Jr. | ............... | E04C 2/384 52/309.7 |
| 5,941,238 A * | 8/1999 | Tracy | ............... | F28D 20/0039 62/260 |
| 6,220,339 B1 * | 4/2001 | Krecke | ............... | F24D 11/003 126/621 |
| 8,801,851 B2 | 8/2014 | Jezequel et al. | | |
| 9,518,787 B2 * | 12/2016 | Pilebro | ............... | F24D 3/08 |
| 9,709,349 B2 | 7/2017 | Raman et al. | | |
| 2008/0041364 A1 * | 2/2008 | Brock | ............... | F24S 20/66 126/621 |
| 2012/0125019 A1 * | 5/2012 | Sami | ............... | F25B 30/06 62/235.1 |
| 2012/0227926 A1 * | 9/2012 | Field | ............... | F24H 7/0441 165/157 |
| 2013/0228303 A1 | 9/2013 | Eskilsby | | |
| 2014/0182831 A1 * | 7/2014 | Hauenstein | ............... | F24F 5/0075 165/185 |
| 2016/0108761 A1 * | 4/2016 | Frazier | ............... | F01K 3/12 60/659 |
| 2016/0195340 A1 * | 7/2016 | Bissell | ............... | F28D 20/021 165/10 |
| 2017/0248381 A1 | 8/2017 | Yang et al. | | |
| 2019/0072338 A1 * | 3/2019 | Wirz | ............... | F28D 17/04 |
| 2021/0376787 A1 * | 12/2021 | Ryan | ............... | H02S 30/20 |

OTHER PUBLICATIONS

Zhang, Metamaterials for perpetual cooling at large scale, Science 335:6329, 1023-1024, Mar. 10, 2017.

* cited by examiner

APPARATUS AND METHOD FOR SOLAR HEAT COLLECTION

CROSS-REFERENCE TO RELATED APPLICATIONS

This application claims the benefit, under 35 U.S.C. § 119(e), of U.S. Provisional Patent Application No. 62/874,345, filed Jul. 15, 2019, titled "Apparatus and Method for Solar Heat Collection," which application is incorporated herein by reference in its entirety.

FIELD OF THE INVENTION

This invention relates to the field of solar heat collection and storage, and more specifically to a method and apparatus of collecting solar heat energy into a transfer fluid and more efficiently transferring heat from the transfer fluid into segregated heat storage beds.

BACKGROUND OF THE INVENTION

U.S. Pat. No. 4,000,851 issued to Heilemann on Jan. 4, 1977 with the title "Solar-heated dwelling," and is incorporated herein by reference. U.S. Pat. No. 4,000,851 describes rotatably adjustable elongated cylindrical solar collector plate cells, rotatable around the elongated axis thereof for adjusting angle of incidence of exterior light rays from the sun to the surface of the collector plate, are mounted upon a roof with water flow therefrom being channeled below an insulated ceiling downwardly for alternate flow as between parallel flow paths alternately selectively to and through concrete slab conduits having copper tubing directing heated water therethrough, and the parallel flow conduits through a layer of rocks beneath the concrete slab, the concrete slab being a part of the floor structure of the dwelling and the layer of rocks being a reservoir sink there beneath, flow being directed dependent upon differential temperature of the upper floor surface of the concrete slab, such that space within supporting wall room space defined between the ceiling and the floor is economically heated devoid of excessive room temperatures and with substantially level and constant ambient temperature ranges as desired and preset within the room space over extended periods of time for and throughout a heating season of the year, while being inoperative and non-functional when heat is not desired, and including further a hot-water heating provision embodied within an intermediate heat exchanger located between the solar cells fluid circuit and the concrete slab heating circuit, each circuit having its individual circulation pump controlled by its respective thermostat.

German Patent Application Publication Serial No. 202007009141U1 (which is incorporated herein by reference) describes use of so-called surface solar-heat collectors, which are mostly arranged on roofs of buildings, a liquid heat transfer medium is used, which is supplied by means of a pump to a heat utilization device. The heat utilization device may be a heat storage in the simplest case, for example, a heat-insulated container filled with storage liquid, the storage liquid being separated from the heat transfer medium by a heat exchanger. On the side of the heat accumulator a pump is also usually provided.

U.S. Pat. No. 4,321,962 issued to Doty on Mar. 30, 1982 with the title "Sub-basement sensible heat storage for solar energy," and is incorporated by reference. U.S. Pat. No. 4,321,962 describes sensible heat storage method for use in conventional buildings with basements is disclosed that permits the long-term storage of solar energy at reasonable efficiency in amounts appropriate for home heating. An exchanger consisting of a plurality of closely spaced, small diameter parallel or serpentine tubes with suitable manifolds is constructed on the central portion of the basement floor. The exchanger is covered with a layer of fine gravel, followed with a layer of waterproof insulation. Finally, a second floor is supported on studs resting edgewise on the original basement floor. Horizontal conduction heat losses are reduced by allowing a peripheral margin, insulated from above, about the exchanger and by using a flow reversing system that maintains a horizontal temperature gradient within the exchanger.

U.S. Pat. No. 8,801,851 issued to Jezequel et al. on Aug. 12, 2014 with the title "Foamed concrete," and is incorporated herein by reference. U.S. Pat. No. 8,801,851 describes a foamed concrete having a density from 100 to 800 kg/m$^3$ including by mass relative to the total mass of the concrete: a cement; water; from 0.01 to 5% of a water-reducing agent, plasticizer or superplasticizer; from 0.45 to 5% of a foaming agent relative to the amount of water; from 0.01 to 5% of a water-soluble calcium salt; inorganic particles from 0.1 to 300 μm in size; the ratio of foaming agent to calcium salt being from 0.3 to 0.8; excluding foamed concretes including 10% or more by mass of slag.

U.S. Pat. No. 9,709,349 to Raman et al. issued on Jul. 18, 2017 with the title "Structures for radiative cooling," and is incorporated herein by reference. U.S. Pat. No. 9,709,349 is directed to a radiative cooling device and method for cooling an object. A radiative cooling device includes a solar spectrum reflecting structure configured and arranged to suppress light modes, and a thermally-emissive structure configured and arranged to facilitate thermally-generated electromagnetic emissions from the object and in mid-infrared (IR) wavelengths.

U.S. Patent Application Publication 20130228303 by Eskilsby published Sep. 5, 2013 with the title "System for Storing Thermal Energy, Heating Assembly Comprising Said System and Method of Manufacturing Said System," and is incorporated herein by reference. Patent Publication 20130228303 describes a storage system for storing thermal energy for use in heating a building or heating water, said system comprising—a cavity with a bottom surface, at least one side surface and a top surface, —at least one hose for transporting a fluid, said hose being placed inside said cavity and being arranged to be connected to a heating assembly or producing and/or using thermal energy, and wherein said cavity comprises a stone dust material for covering said at least one hose and only one of said top, side and bottom surfaces is equipped with an insulating layer, namely said top surface. Patent Publication 20130228303 also relates to a heating assembly comprising a storage system and a method for manufacturing a storage system.

U.S. Patent Application Publication 20170248381 by YANG, Ronggui et al. published on Aug. 31, 2017 with the title "RADIATIVE COOLING STRUCTURES AND SYSTEMS," and is incorporated herein by reference. Patent Publication 20170248381 describes a polymer-based selective radiative cooling structures that include a selectively emissive layer of a polymer or a polymer matrix composite material. Exemplary selective radiative cooling structures are in the form of a sheet, film or coating. Also described are methods for removing heat from a body by selective thermal radiation using polymer-based selective radiative cooling structures.

PCT Publication WO2010041961 titled "Heating system" is incorporated herein by reference. PCT Publication WO2010041961 describes a heating system that includes a building having a foundation slab, a solar energy collector associated with the building, a heat core which stores heat below the level of the slab, a layer of thermal insulation between the slab and the heat core, transfer means for transferring heat energy between: a. the solar energy collector on the one hand and the slab and/or the heat core on the other hand; and b. the slab and the heat core, the heating system also comprising a controller which determines the temperature of the interior of the building and within the heat core and distributes energy stored within the heat core to the building to regulate the temperature within the building.

PCT Publication WO2012039662 by Jan-Erik Eskilsby titled "System for storing thermal energy, heating assembly comprising said system and method of manufacturing said system" is incorporated herein by reference. PCT Publication WO2012039662 describes a storage system for storing thermal energy for use in heating a building or heating water, said system comprising—a cavity with a bottom surface, at least one side surface and a top surface, at least one hose for transporting a fluid, said hose being placed inside said cavity and being arranged to be connected to a heating assembly for producing and/or using thermal energy, and wherein said cavity comprises a stone dust material for covering said at least one hose and only one of said top, side and bottom surfaces is equipped with an insulating layer, namely said top surface. Publication WO2012039662 also relates to a heating assembly comprising a storage system and a method for manufacturing a storage system.

An article by Xiang Zhang titled "Metamaterials for perpetual cooling at large scales," Science, VOL 355 ISSUE 6329 page 1023 (10 Mar. 2017) describes a film made by Yao Zhai et al. (reference below) with tiny glass spheres in a plastic polymer film substrate that strongly emit infrared light, cooling objects in contact with the film.

An article "Scalable-manufactured randomized glass-polymer hybrid metamaterial for daytime radiative cooling" by Yao Zhai et al., SCIENCE VOL 355 ISSUE 6325 page 1062 (9 Feb. 2017), describes a film made with tiny glass spheres in a plastic polymer film substrate that strongly emit infrared light, cooling objects in contact with the film.

What is needed is a more efficient apparatus and method for collecting and storing heat energy from a solar collector.

SUMMARY OF THE INVENTION

The present invention provides a more efficient apparatus and method for collecting and storing heat energy from a solar collector. In some embodiments, the present invention provides a method and apparatus that use a solar collector and a plurality of heating-energy-storage cells that are each thermally insulated from one another, wherein a heating energy-transfer fluid (HETF) coming from the solar collector is transferred to the energy-storage cell having the highest temperature that is lower than the temperature of the HETF, in order to segregate energy-storage cells to more efficiently store heating energy. Some embodiments further include an energy radiator that radiates thermal energy to an environment and thereby cools a cooling-energy-transfer fluid (CETF) and a plurality of cooling-energy-storage cells that are each thermally insulated from one another, wherein the CETF coming from the energy radiator is transferred to the cooling-energy-storage cell having the lowest temperature that is higher than the temperature of the ETF, in order to segregate cooling-energy-storage cells to more efficiently store cooling energy.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown herein.

DESCRIPTION OF PREFERRED EMBODIMENTS

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
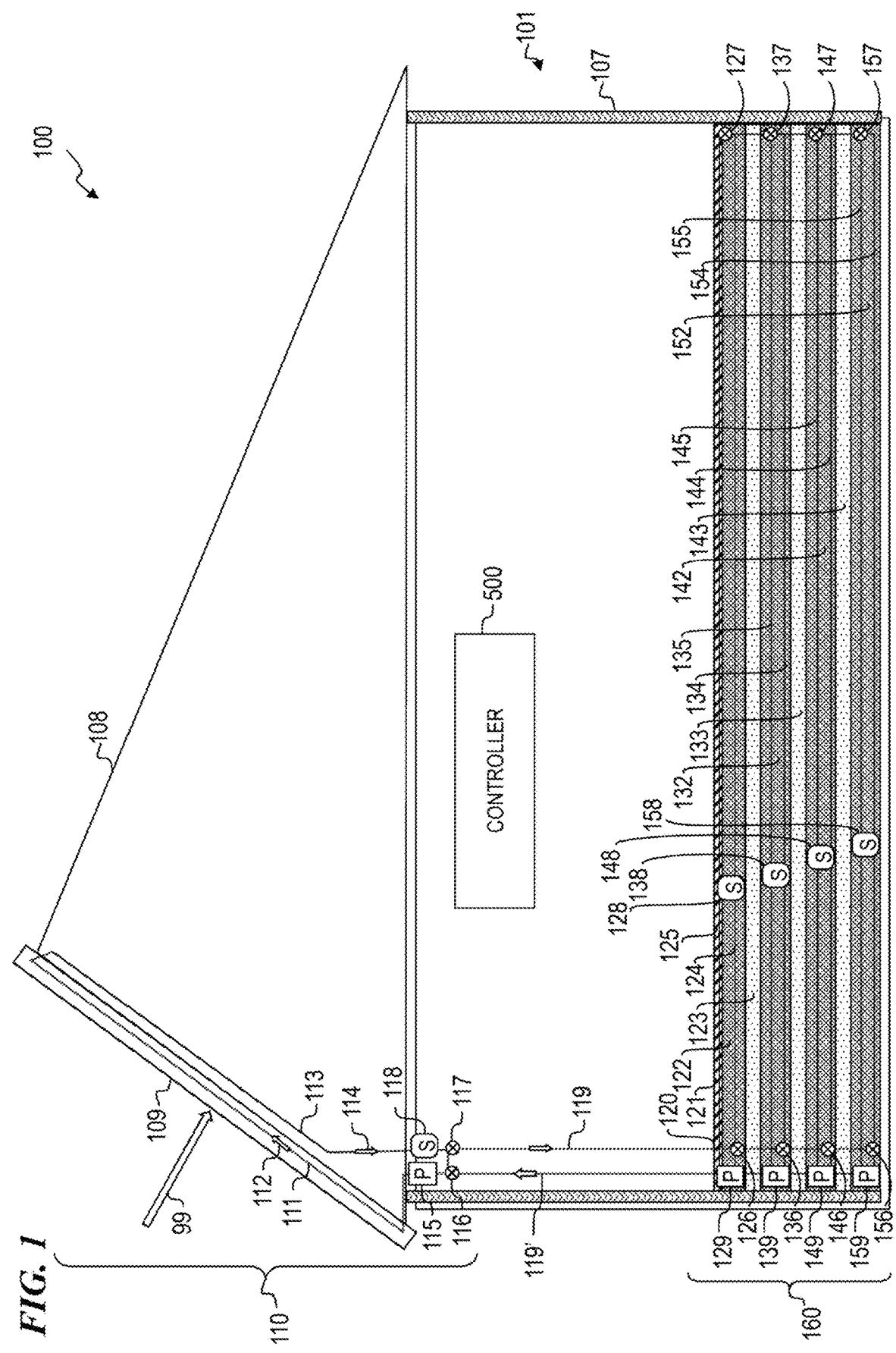
FIG. 1 is a schematic diagram of one embodiment of a solar heat collection and storage system 100 having a solar heat collector system 110 and a heat storage and retrieval system 160, according to some embodiments of the present invention.

FIG. 1 is a schematic diagram of one embodiment of a solar heat collection and storage system 100 having a solar heat collector system 110 and a heat storage and retrieval system 160, according to some embodiments of the present invention. In some embodiments, solar heat collector system 110 includes a solar absorption surface collector 109 on the roof 108 of a building 101 having insulated sidewalls 107. Solar heat collector system 110 includes a pump 115 that pumps an energy-transfer fluid ("ETF," such as water, water-plus-antifreeze, or other suitable liquid or gas) through a fluid conduit 111 in direction 112 where the ETF absorbs heat from the solar absorption surface collector 109 and increases in temperature, and the heated ETF the returns via downward conduit 113 in direction 114.

When the ETF is being used to transfer heat energy from solar connector system 110 to heat-storage system 160, or from one heat-storage cell or layer 122, 132, 142 ... 152 to another, it is referred to as "heating ETF" or "HETF." On the other hand, when the ETF is being used to transfer cooling energy (see FIG. 2) from cooling (radiative heat dissipator) system 210 to cooling-storage system 260, or from one cooling-storage cell or layer 122, 232, 242 ... 252 to another, it is referred to as "cooling ETF" or "CETF." In some embodiments, when heat-storage cells 122, 132, 142 ... 152 are configured as having large horizontal extents, and are separated from one another by horizontal insulating layers the cells are referred to herein simply as heat-storage layers 122, 132, 142 ... 152. Generically, these heat-storage cells are referred to as heat-storage cells whether horizontally separated or vertically separated from one another.

During the heat-collecting hours of the day, temperature sensor 118 measures the temperature of HETF, and if the temperature of HETF is not higher than at least one of the plurality of heat-storage reservoirs 122, 132, 142, ... 152, then valves 117 and 116 will route the HETF back to pump 115, which will continue to circulate the HETF just through the solar heat collector system 110 until the temperature of HETF is higher than at least one of the plurality of heat-storage reservoirs 122, 132, 142, ... or 152, and when that condition is satisfied, controller 500 (described more fully in the discussion of FIG. 5) will control valve 117 to switch to direct the HETF downward through conduit 119 toward the heat storage and retrieval system 160. HETF returning from the heat storage and retrieval system 160 comes back via the upward direction via conduit 119'.

In some embodiments, heat storage and retrieval system 160 includes a plurality of heat-storage reservoirs 122, 132, 142, ... 152 made of low-strength concrete and rock aggregate through which outgoing HETF conduits 124, 134, 144, ... 154 and returning HETF conduits 125, 135, 145, ... 155 (e.g., in some embodiments, the HETF conduits are made of cross-linked polyethylene (commonly called PEX) tubing) are looped, laid as a serpentine and/or inter-laced configuration throughout the low-strength concrete layers of heat-storage reservoirs 122, 132, 142, ... 152. In some embodiments, the uppermost heat-storage reservoir 122 is covered by a top layer of high-strength concrete 121, and the upper surface 120 of top layer concrete 121 forms a floor of the living quarters of a house formed by building 101. In other embodiments, the building 101 forms a stable of barn for farm animals such as horses, pigs, cattle, poultry or the like. In other embodiments, the building 101 forms a garage or machinery shed or the like. In some embodiments, heat-storage reservoirs 122 is thermally separated from heat-storage reservoir 132 by an insulating layer 123 of foamed or cellular concrete (also known as lightweight cellular concrete (LCC), low-density cellular concrete (LDCC), aircrete, foamed concrete, foamcrete, cellular lightweight concrete or reduced density concrete, which, in some embodiments, is a cement-based slurry, with a minimum of 20% (per volume) air entrained into the plastic mortar (notation adapted from Wikipedia)) that has had a foaming agent added and is filled with very small or microscopic air bubbles. In some embodiments, the foam concrete for layers 123, 133 ... 143 includes materials such as described in U.S. Pat. No. 8,801,851 to Jezequel et al., which is incorporated herein by reference. In some embodiments, such foam concrete is also used for or used in walls 107 and/or as a substrate in solar collector 110. Similarly, insulating layer 133 thermally insulates heat-storage reservoirs 142 from heat-storage reservoir 132, and insulating layer 143 thermally insulates heat-storage reservoirs 152 from heat-storage reservoir 142. In some embodiments, no insulation layer is placed below the bottom-most heat-storage reservoir 152 in order to allow the ground below to store additional heat energy dissipating downward from bottom-most heat-storage reservoir 152.

In some embodiments, controller 500 gathers information from sensors 118, 128, 138 ... 148 and controls pumps 115, 129, 139, 149 ... 159 and valves 116, 117, 126, 127, 136, 137, 146, 147, ... 156, 157 in order to move the HETF to the one of the plurality of heat-storage reservoirs 122, 132, 142, ... 152 having the highest-temperature that is below the temperature of the HETF. In some embodiments, valves 116, 117, 126, 127, 136, 137, 146, 147, ... 156, 157 are each bi-directional (or multi-directional) valves that selectively route the HETF into and through one of the conduit circuits of PEX tubing in the plurality of heat-storage reservoirs 122, 132, 142, ... 152.

For example, in some embodiments, valve 126 is activated (by controller 500) to direct HETF in a first direction to go through conduit tubing 124 that deposits heat energy into heat-storage reservoir 122, or is activated to direct HETF in a second direction to go downward to valve 136, or is activated to direct HETF in a third direction to go leftward to pump 129, which then pumps the HETF upward through return conduit 119'. In a similar manner, in some embodiments, valve 127 is activated (by controller 500) to direct HETF in a first direction to return through conduit tubing 125 that deposits heat energy into high-strength concrete layer 121 and/or further in heat-storage reservoir 122, or is activated to direct HETF in a second direction to go downward to valve 137.

Further, in some embodiments, valve 136 is activated (by controller 500) to direct HETF in a first direction to go through conduit tubing 134 that deposits heat energy into heat-storage reservoir 132, or is activated to direct HETF in a second direction to go downward to valve 146, or is activated to direct HETF in a third direction to go leftward to pump 139, which then pumps the HETF upward to pump 129, which then pumps the HETF upward through return conduit 119'. In a similar manner, in some embodiments, valve 137 is activated (by controller 500) to direct HETF in a first direction to return through conduit tubing 135 that deposits remaining heat energy into further in heat-storage reservoir 132, or is activated to direct HETF in a second direction to go downward to valve 147, or is activated to direct HETF in a third direction to go upward to valve 127.

Still further, in some embodiments, valve 146 is activated (by controller 500) to direct HETF in a first direction to go through conduit tubing 144 that deposits heat energy into heat-storage reservoir 142, or is activated to direct HETF in a second direction to go downward to valve 156, or is activated to direct HETF in a third direction to go leftward to pump 149, which then pumps the HETF upward to pump 139, which then pumps the HETF upward to pump 129, which then pumps the HETF upward through return conduit 119'. In a similar manner, in some embodiments, valve 147 is activated (by controller 500) to direct HETF in a first direction to return through conduit tubing 145 that deposits remaining heat energy into further in heat-storage reservoir 142, or is activated to direct HETF in a second direction to go downward to valve 157, or is activated to direct HETF in a third direction to go upward to valve 137.

Yet further, in some embodiments, valve 156 is activated (by controller 500) to direct HETF in a first direction to go through conduit tubing 154 that deposits heat energy into heat-storage reservoir 152, or is activated to direct HETF in a second direction to go leftward to pump 159. In a similar manner, in some embodiments, valve 157 is activated (by controller 500) to direct HETF in a first direction to return through conduit tubing 155 that deposits remaining heat energy into further in heat-storage reservoir 152, or is activated to direct HETF in a second direction to go upward to valve 147.

In some embodiments, additional valves and/or pumps (not shown) are also controlled by controller 500 to further route the HETF that is exiting one of the plurality of heat-storage reservoirs 122, 132, 142, . . . 152 to then go through another one of the plurality of heat-storage reservoirs 122, 132, 142, . . . 152 having the next highest temperature that is below the temperature of the HETF. In that way, the HETF is generally not passed through any of the plurality of heat-storage reservoirs 122, 132, 142, . . . 152 that has a higher temperature than the temperature of the HETF, since that would remove the stored heat from that reservoir, however, in some embodiments, doing so is performed in order to move stored heat energy out of one of the plurality of heat-storage reservoirs 122, 132, 142, . . . 152 and into another of the plurality of heat-storage reservoirs 122, 132, 142, . . . 152. By segregating the various heat-storage reservoirs into different "heat-quality" zones (wherein the heat-quality is defined by both the temperature of the zone and the heat-storage energy capacity of the zone), system 100 can provide high-temperature heating to the living quarters when needed, and keep larger quantities of lower temperature energy for long term heating needs.

In addition, in some embodiments, the highest-temperature HETF can be used to heat the domestic bathing and drinking water system (which may need to have the highest temperature energy, but need a relatively smaller amount of heat capacity) before the HETF is routed through the plurality of heat-storage reservoirs 122, 132, 142, . . . 152.

In some embodiments, the spatial volume (and thus the amount of energy-storage capacity) for one or more of the plurality of heat-storage reservoirs 122, 132, 142, . . . 152 is made much smaller than others of the plurality of heat-storage reservoirs 122, 132, 142, . . . 152, in order that its temperature can be made to be much higher much quicker. Conversely, the spatial volume (and thus the amount of energy-storage capacity) for one or more of the plurality of heat-storage reservoirs 122, 132, 142, . . . 152 (e.g., in particular, heat-storage reservoir 152 along with its very large ground substrate material) is made much larger than others of the plurality of heat-storage reservoirs 122, 132, 142, . . . 152, in order that its energy storage capacity can be made to be much higher with the concomitant much slower temperature-rise rate.

In some embodiments, controller 500 is also connected to one or more thermostats and/or one or more motion sensors that detect the presence of human occupants, in order to control the indoor environment of building 101 under the dynamic or pre-programmed control of its human occupants, with a plurality of different spatial zones being defined in building 101, each programmed for different temperatures and for different temporal schedules of heating or cooling during various hours of each day or various days of the week, or different seasons of the year.

Figure 2:
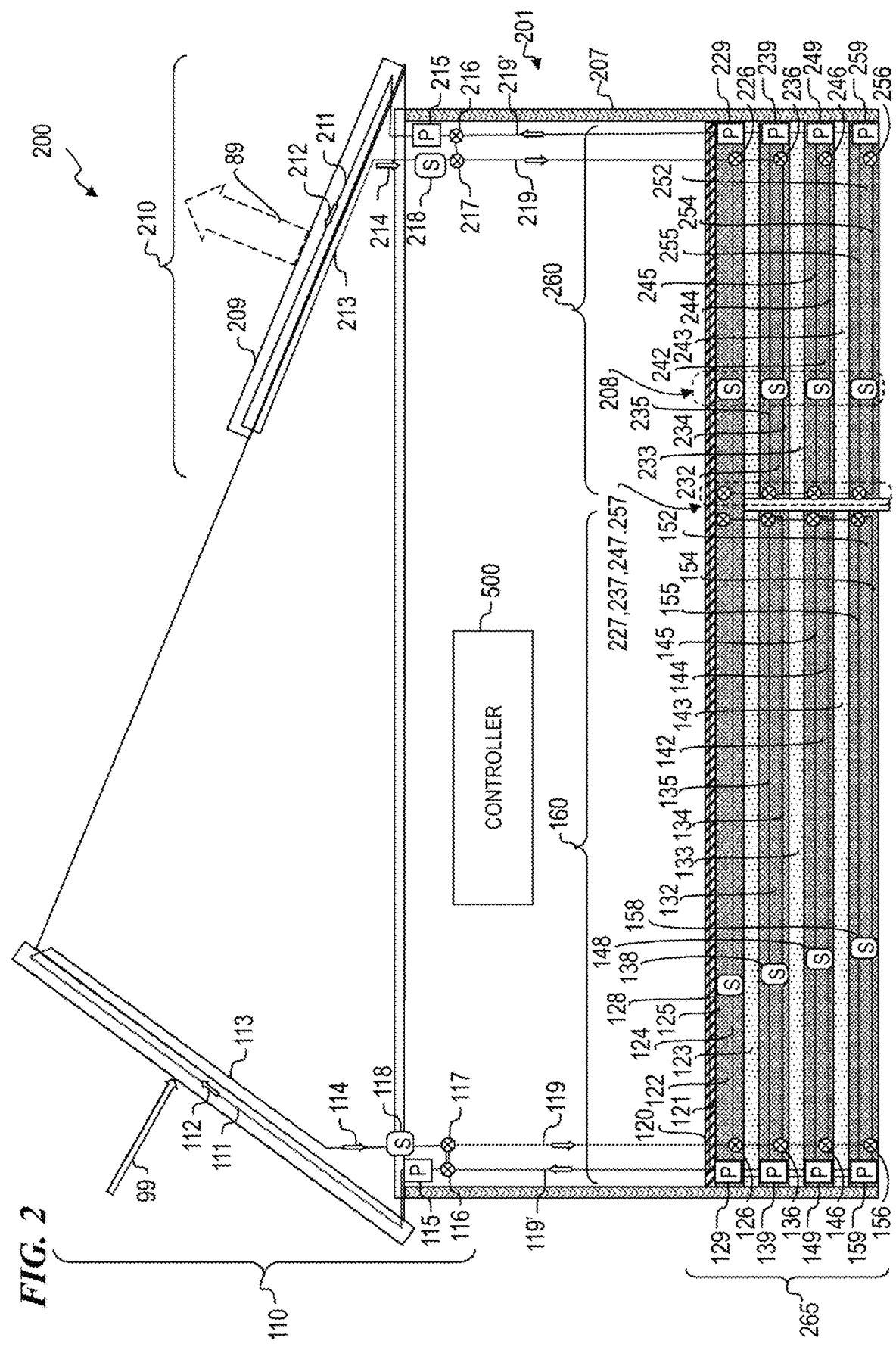
FIG. 2 is a schematic diagram of one embodiment of a solar heat collection, dissipation and storage system 200 having a solar heat collector 110, cooling (radiative heat dissipator) system 210, a heat storage and retrieval system 160, and a cooling storage and retrieval system 260, according to some embodiments of the present invention.

FIG. 2 is a schematic diagram of one embodiment of a solar-heat collection, dissipation and storage system 200 having a solar heat collector 110, cooling (radiative heat dissipator) system 210, a heat-storage-and-retrieval system 160, and a cooling-storage-and-retrieval system 260, according to some embodiments of the present invention. In some embodiments, solar-heat collection, dissipation and storage system 200 is substantially similar to solar heat collection and storage system 100 of FIG. 1, but with the addition of cooling provided by cooling (radiative heat dissipator) system 210 and cooling-storage-and-retrieval system 260 on building 201. Together, cooling-storage-and-retrieval system 260 and heat-storage-and-retrieval system 160 are referred to as energy storage system 265. Accordingly, the reference numbers of FIG. 2 that were already described above in the discussion of FIG. 1 will not be repeated here. In some embodiments, cooling (radiative heat dissipator) system 210 is oriented to radiate energy to the sky, and includes a radiating material surface 209 (such as tiny glass spheres in a plastic film that strongly emit infrared light 89, cooling objects below, as described by Y. ZHAI ET AL., SCIENCE 355, 6325 (9 Feb. 2017)) that radiates more energy than it absorbs, even in sunlight. In other embodiments, cooling (radiative heat dissipator) system 210 includes radiative surface(s) 209 that include materials and/or configurations such as described in U.S. Patent Application Publication 20170248381 by Yang et al. titled "RADIATIVE COOLING STRUCTURES AND SYSTEMS," which is incorporated herein by reference, and/or materials such as described in U.S. Pat. No. 9,709,349 to Raman et al. titled "Structures for radiative cooling," which is incorporated herein by reference. In some embodiments, the radiative surfaces 209 absorb little (e.g., in some embodiments, less than 10%) of visible and short-wave infrared light (200 nm to 1000 nm wavelengths), but strongly emit far infrared (e.g., 10,000 nm wavelengths) light 89 that is not absorbed by the atmosphere and thus escapes to outer space, thus cooling the surface up to 10 degrees C. or more lower than the ambient air temperature. In some embodiments (not shown), walls 207 are optionally covered by radiating material 209, include fluid conduits for transferring energy to the radiative surface 209, and are optionally also utilized to radiate heat away from building 201.

In some embodiments, cooling (radiative heat dissipator) system 210 includes a pump 215 that pumps a coolingenergy-transfer fluid ("CETF," such as water, water-plus-antifreeze, or other suitable liquid or gas) through a fluid conduit 211 in direction 212 where the CETF transfers heat to the radiating material surface 209 and decreases in temperature, and the cooled CETF the returns via downward conduit 213 in direction 214.

During the cooling hours of the day (which, in some embodiments, can include all 24 hours each day), temperature sensor 118 measures the temperature of CETF, and if the temperature of CETF is not lower than at least one of the plurality of cool-storage reservoirs 232, 242, . . . 252, then valves 217 and 216 will route the CETF back to pump 215, which will continue to circulate the CETF just through the cooling (radiative heat dissipator) system 210 until the temperature of CETF is lower than at least one of the plurality of cool-storage reservoirs 232, 242, . . . or 252, and when that condition is satisfied, controller 500 (described more fully in the discussion of FIG. 5) will control valve 217 to switch to direct the CETF downward through conduit 219 toward the cooling-storage-and-retrieval system 260. CETF returning from the heat storage and retrieval system 160 comes back via the upward direction via conduit 219'.

In some embodiments, cooling-storage-and-retrieval system 260 includes a plurality of cooling reservoirs 232, 242 . . . 252 made of low-strength concrete and rock aggregate through which outgoing CETF conduits 234, 244, . . . 254 and returning CETF conduits 235, 245, . . . 255 (e.g., in some embodiments, the CETF conduits are made of cross-linked polyethylene (commonly called PEX) tubing) are looped, laid as a serpentine and/or interlaced configuration throughout the low-strength concrete layers of heat-storage reservoirs 232, 242, . . . 252.

In some embodiments, the uppermost heat-storage reservoir 122 is shared by both heat-storage-and-retrieval system 160 and cooling-storage-and-retrieval system 260 (and thus is also called heat-storage/cooling-storage reservoir 122 when discussing FIG. 2) and is covered by a top layer of high-strength concrete 121, and the upper surface 120 of top layer concrete 121 forms a floor of the living quarters of a house formed by building 201 as described above for FIG. 1. In other embodiments, the building 201 forms a stable of barn for farm animals such as horses, pigs, cattle, poultry or the like. In other embodiments, the building 201 forms a garage or machinery shed or the like. The temperature of the uppermost heat-storage reservoir 122 can be adjusted to control any effect the lower heat storage layers might have on floor temperature.

In some embodiments, heat-storage/cooling-storage reservoir 122 is thermally separated from cooling-storage reservoir 232 by insulating layer 123 of foamed or cellular concrete as described above for FIG. 1. In some embodiments, the foam concrete for layers 123, 233 . . . 243 includes materials such as described in U.S. Pat. No. 8,801,851 to Jezequel et al., which is incorporated herein by reference. In some embodiments, such foam concrete is also used for or used in walls 207 and/or as a substrate in cooling (radiative heat dissipator) system 210. Similarly, insulating layer 233 thermally insulates cooling-storage reservoirs 242 from cooling-storage reservoir 232, and insulating layer 243 thermally insulates cooling-storage reservoirs 252 from cooling-storage reservoir 242. In some embodiments, no insulation layer is placed below the bottom-most cooling-storage reservoir 252 in order to allow the ground below to store additional cooling energy dissipating downward from bottom-most cooling-storage reservoir 252.

In some embodiments, controller 500 gathers information from sensors 208 and controls pumps 215, 229, 239, 249 . . . 259 and valves 216, 217, 226, 227, 236, 237, 246, 247, . . . 256, 257 (wherein 227, 237, 247, 257 are numbered top to bottom) and the other valves not numbered here in order to move the CETF to the one of the plurality of cooling-storage reservoirs 122, 232, 242, . . . 252 having the lowest-temperature that is above the temperature of the CETF. In some embodiments, valves 216, 217, 226, 236, 246, . . . 256 and the other valves are each bi-directional (or multi-directional) valves that selectively route the CETF into and through one of the conduit circuits of PEX tubing in the plurality of cooling-storage/heat-storage reservoir 122 or cooling-storage reservoirs 232, 242, . . . 252.

For example, in some embodiments, valve 226 is activated (by controller 500) to direct CETF in a first direction to go through conduit tubing 124 that deposits cooling energy into cooling-storage/heat-storage reservoir 122, or is activated to direct CETF in a second direction to go downward to valve 236, or is activated to direct CETF in a third direction to go leftward to pump 229, which then pumps the CETF upward through return conduit 219'. In a similar manner, in some embodiments, valve 227 is activated (by controller 500) to direct CETF in a first direction to return through conduit tubing 125 that deposits cooling energy into high-strength concrete layer 121 and/or further in cooling-storage/heat-storage reservoir 122, or is activated to direct CETF in a second direction to go downward to valve 237.

Further, in some embodiments, valve 236 is activated (by controller 500) to direct CETF in a first direction to go through conduit tubing 234 that deposits cooling energy into cooling-storage reservoir 232, or is activated to direct CETF in a second direction to go downward to valve 246, or is activated to direct CETF in a third direction to go rightward to pump 239, which then pumps the CETF upward to pump 229, which then pumps the CETF upward through return conduit 219'. In a similar manner, in some embodiments, valve 237 is activated (by controller 500) to direct CETF in a first direction to return through conduit tubing 235 that deposits remaining cooling energy into further in cooling-storage reservoir 232, or is activated to direct CETF in a second direction to go downward to valve 247, or is activated to direct CETF in a third direction to go upward to valve 227.

Still further, in some embodiments, valve 246 is activated (by controller 500) to direct CETF in a first direction to go through conduit tubing 244 that deposits cooling energy into cooling-storage reservoir 242, or is activated to direct CETF in a second direction to go downward to valve 256, or is activated to direct CETF in a third direction to go leftward to pump 249, which then pumps the CETF upward to pump 239, which then pumps the CETF upward to pump 229, which then pumps the CETF upward through return conduit 219'. In a similar manner, in some embodiments, valve 247 is activated (by controller 500) to direct CETF in a first direction to return through conduit tubing 245 that deposits remaining cooling energy into further in cooling-storage reservoir 242, or is activated to direct CETF in a second direction to go downward to valve 257, or is activated to direct CETF in a third direction to go upward to valve 237.

Yet further, in some embodiments, valve 256 is activated (by controller 500) to direct CETF in a first direction to go through conduit tubing 154 that deposits cooling energy into cooling-storage reservoir 252, or is activated to direct CETF in a second direction to go leftward to pump 259. In a similar manner, in some embodiments, valve 257 is activated (by controller 500) to direct CETF in a first direction to return through conduit tubing 255 that deposits remaining cooling energy into further in cooling-storage reservoir 252, or is activated to direct CETF in a second direction to go upward to valve 247.

In some embodiments, additional valves and/or pumps (not shown) are also controlled by controller 500 to further route the CETF that is exiting cooling-storage/heat-storage reservoir 122 or one of the plurality of cooling-storage reservoirs 232, 242, . . . 252 to then go through another one of the plurality of cooling-storage reservoirs 232, 242, . . . 252 having the next lowest temperature that is above the temperature of the CETF. In that way, the cooling CETF is generally not passed through any of the plurality of cooling-storage reservoirs 122, 132, 142, . . . 152 that has a lower temperature than the temperature of the cooling CETF, since that would remove the stored cooling from that reservoir, however, in some embodiments, doing so is performed in order to move stored cooling energy out of one of the plurality of cooling-storage reservoirs 122, 232, 242, . . . 252 and into another of the plurality of cooling-storage reservoirs 122, 232, 242, . . . 252. By segregating the various cooling-storage reservoirs into different "cooling-quality" zones (wherein the cooling-quality is defined by both the temperature of the zone and the cooling-storage energy capacity of the zone), system 100 can provide low-temperature cooling to the living quarters when needed, and keep larger quantities of higher temperature cooling energy for long-term cooling needs.

In addition, in some embodiments, the lowest-temperature cooling CETF can be used to cool a refrigerator system to save electrical energy otherwise needed (which may need to have the lowest temperature energy, but need a relatively smaller amount of cooling capacity) before the CETF is routed through the plurality of cooling-storage/heat-storage reservoir 122, or cooling-storage reservoirs 232, 242, . . . 252.

Figure 6:
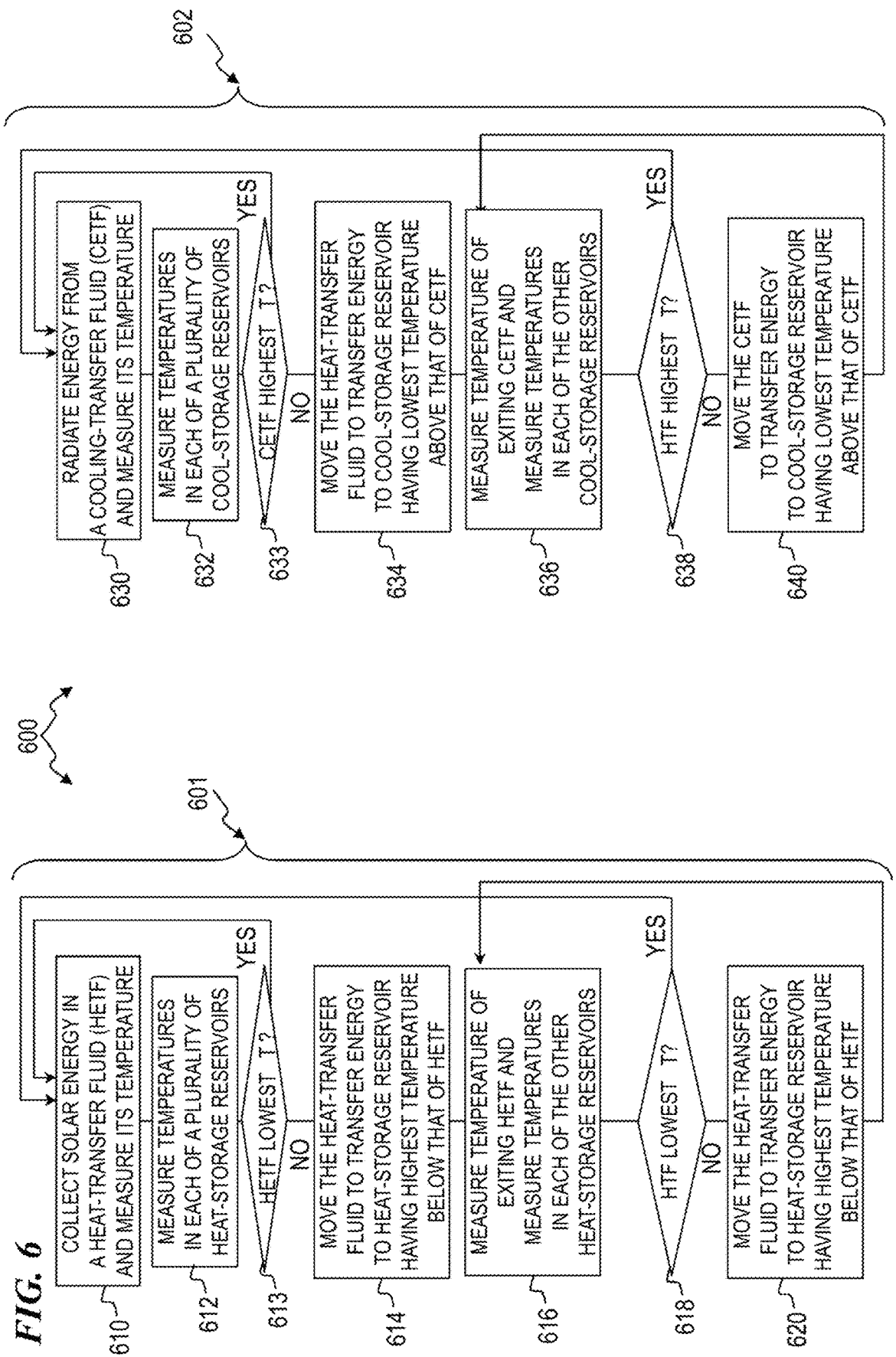
FIG. 6 is a block diagram of solar heat collector controller method 600, according to some embodiments of the present invention.
Figure 7:
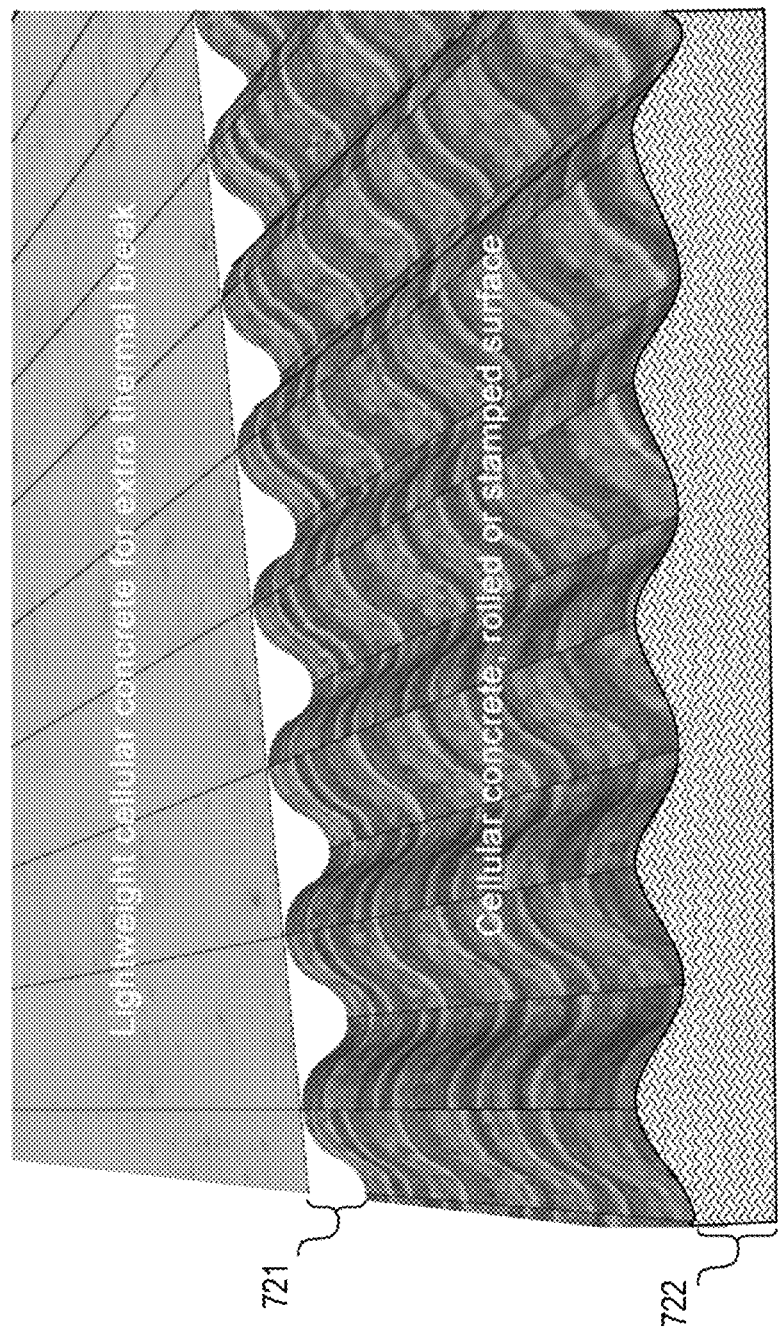

In some embodiments, the spatial volume (and thus the amount of energy-storage capacity) for one or more of the plurality of cooling-storage/heat-storage reservoir 122, or cooling-storage reservoirs 232, 242, . . . 252 is made much smaller than others of the plurality of cooling-storage/heat-storage reservoir 122, or cooling-storage reservoirs 232, 242, . . . 252, in order that its temperature can be made to be much lower much quicker. Conversely, the spatial volume (and thus the amount of energy-storage capacity) for one or more of the plurality of cooling-storage reservoirs 232, 242, . . . 252 (e.g., in particular, cooling-storage reservoir 252 along with its very large ground substrate material) is made much larger than others of the plurality of cooling-storage reservoirs 232, 242, . . . 252, in order that its energy storage capacity can be s-executable program modules (such as shown in FIG. 6, containing instructions executed by controller 500, e.g., in some embodiments, a computer system such as a personal computer (PC) or one or more embedded microcontroller(s). Program modules include programs, objects, data structures and the like that perform particular tasks or implement particular abstract data types. Those skilled in the art will appreciate that the invention may be practiced with other computer-system configurations, including hand-held devices, multiprocessor systems, microprocessor-based programmable consumer electronics, networked PCs, minicomputers, mainframe computers, and the like. In some embodiments, the invention is practiced in distributed computing environments where certain tasks are performed by remote processing devices linked through a communications network. In some embodiments of a distributed computing environment, program modules are located in both local and remote storage devices.

Figure 3:
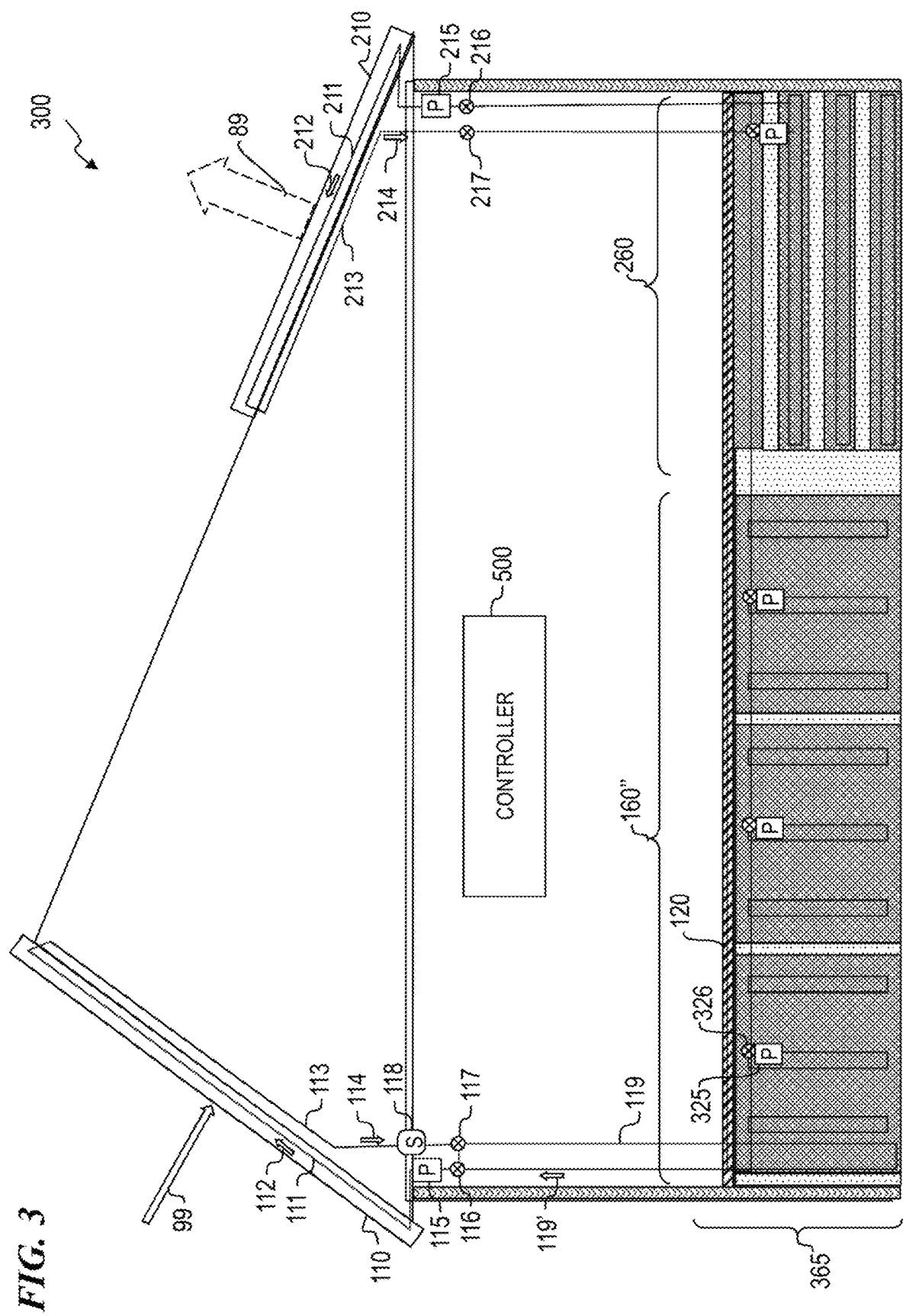
FIG. 3 is a schematic diagram of one embodiment of a solar heat collection, dissipation and storage system 300 having a solar heat collector 110, cooling (radiative heat dissipator) system 210, a heat storage and retrieval system 360, and a cooling storage and retrieval system 260, according to some embodiments of the present invention.

FIG. 3 is a schematic diagram of one embodiment of a solar heat collection, dissipation and storage system 300 having a solar heat collector 110, cooling (radiative heat dissipator) system 210, a heating/cooling storage and retrieval system 365 that includes a vertical-piped heating storage and retrieval system 160" and a cooling storage and retrieval system 260, according to some embodiments of the present invention. In some embodiments, vertical-piped heating storage and retrieval system 160" includes a plurality of PEX tubing channels (which can be implemented by one or more lengths of PEX tubing) that extend in a generally vertical direction (such that the aggregate vertical distance traveled by the heating/cooling energy-transfer fluid (HCETF) that is pumped or flowed through the PEX tubing is greater than the aggregate horizontal distance traveled). In some embodiments, a majority of the PEX tubing channels are oriented within ten degrees (10°) of vertical with respect to a gravitational vertical reference. This is in contrast to the embodiments illustrated in FIG. 1 and FIG. 2 that each includes a plurality of PEX tubing channels (which can be implemented by one or more lengths of PEX tubing) that extend in a generally horizontal direction (such that the aggregate horizontal distance traveled by the heating/cooling energy-transfer fluid (HCETF) that is pumped or flowed through the PEX tubing is greater than the aggregate vertical distance traveled, and wherein in some such embodiments, a majority of the PEX tubing channels are oriented within ten degrees (10°) of horizontal with respect to a gravitational horizontal reference plane).

Figure 4:
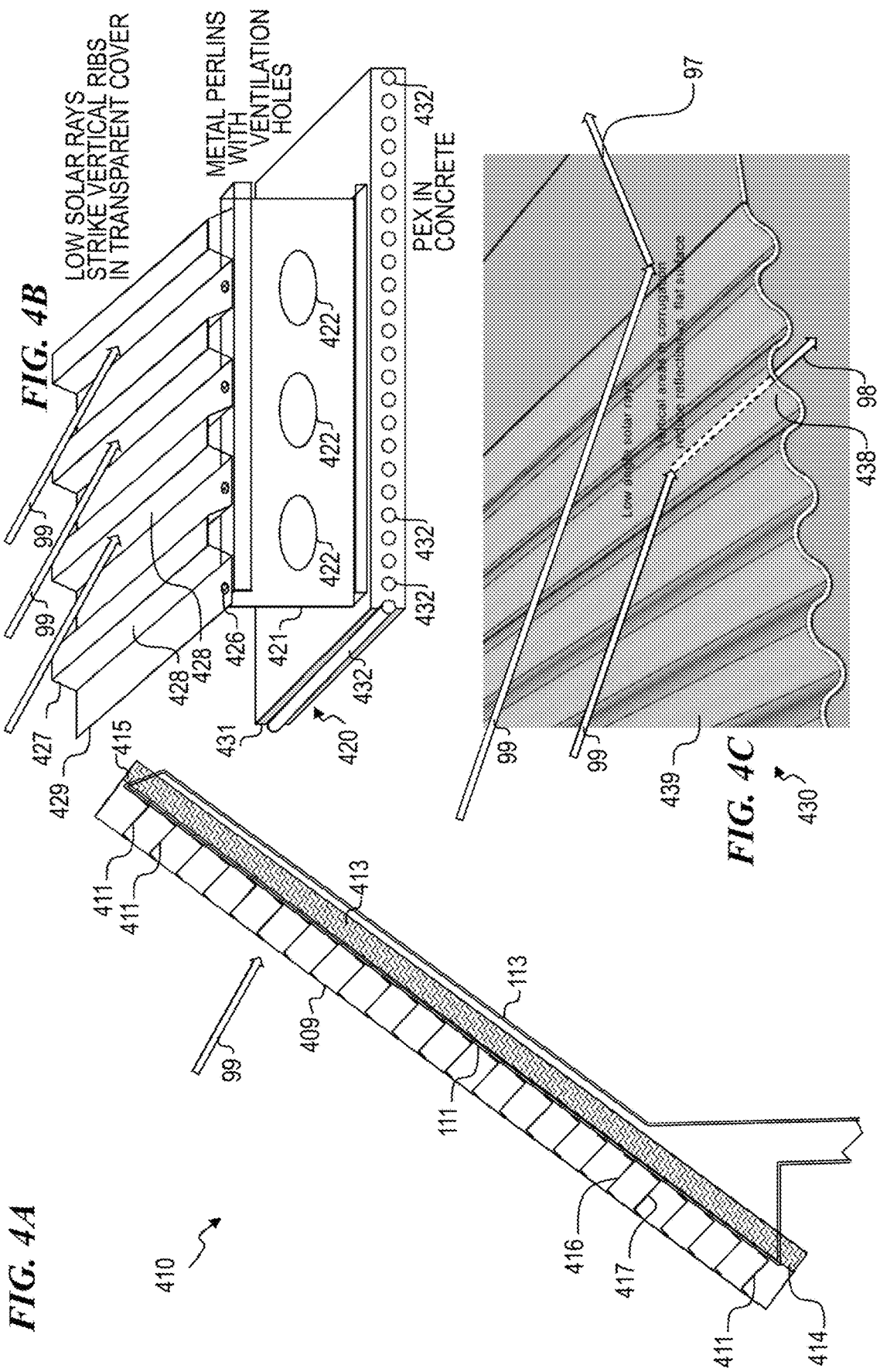
FIG. 4A is a cross-section view of solar heat collector 410 that is used, in some embodiments, for solar heat collector 110 of FIGS. 1, 2, and 3, according to some embodiments of the present invention.
FIG. 4B is a perspective view, partially in cross-section, of solar heat collector 420 that is used, in some embodiments, for solar heat collector 110 of FIGS. 1, 2, and 3, according to some embodiments of the present invention.
FIG. 4C is a perspective view, partially in cross-section, of solar heat collector 430 that is used, in some embodiments, for solar heat collector 110 of FIGS. 1, 2, and 3, according to some embodiments of the present invention.

FIG. 4A is a cross-section view of solar heat collector 410 that is used, in some embodiments, for solar heat collector 110 of FIGS. 1, 2, and 3, according to some embodiments of the present invention. In some embodiments, solar heat collector 410 includes a lower substrate 413 that includes light-weight cellular concrete with tubing 111 that carries pumped heating energy-transfer fluid (HETF) across the surface of substrate 413 (e.g., in some embodiments, between a lower end 414 and an upper end 415 of substrate 413, or in other embodiments, in a serpentine, zig-zag, or other pattern). In some embodiments, tubing 111 is located on the outer surface of substrate 413, while in other embodiments, tubing 111 is embedded in substrate 413 at the outer surface of substrate 413, or further within substrate 413. In some embodiments, solar heat collector 410 includes a plurality of generally horizontal metal purlins 411 that are, in this case, roof framing members that span parallel to the building eave, and that support the transparent roof decking 409. The purlins 411 are in turn supported by substrate 413, or in other embodiments, by rafters or walls. In some embodiments, the upper surface 416 of each purlin 411 is at an angle that faces rays of the summer (high-angle) sunlight and has a surface coating or material that minimizes energy collection (since additional heat is generally not needed in summer), and the lower surface 417 of each purlin 411 is at an angle that faces rays of the winter (low-angle) sunlight and has a surface coating or material that maximizes energy collection (since additional heat is generally needed in winter).

FIG. 4B is a perspective view, partially in cross-section, of solar heat collector 420 that is used, in some embodiments, for solar heat collector 110 of FIGS. 1, 2, and 3, according to some embodiments of the present invention. In some embodiments, solar heat collector 420 includes a ridged transparent roof decking 429 that has raised ribs or ridges 427 that extend in a somewhat vertical direction such that a sun-facing face 428 of each ridge 427 generally faces rays 99 of the winter (low-angle) sunlight in order to reduce glancing reflection of the sunlight (such as shown in FIG. 4C that otherwise would reduce the energy harvesting efficiency of the solar heat collector 420). In some embodiments, solar heat collector 420 includes a substrate of light-weight cellular concrete 431 that has a plurality of PEX-tubing channels 432 that carry heating energy-transfer fluid (HETF) through substrate 431. A plurality of purlins 421 are fastened to substrate 431 along the bottom edge and have fasteners 426 that connect transparent roof decking 429 to purlins 421. In some embodiments, each purlin 421 includes a plurality of holes 422 that facilitate air movement that can be used, for example, to reduce excess heat collection in summer when such energy collection is not needed.

FIG. 4C is a perspective view, partially in cross-section, of solar heat collector 430 that is used, in some embodiments, for solar heat collector 110 of FIGS. 1, 2, and 3, according to some embodiments of the present invention. In some embodiments, solar heat collector 420 includes a wavy transparent roof decking 439 that has raised ribs that extend in a somewhat vertical direction such that a sun-facing face 438 of each ridge generally faces rays 99 of the winter (low-angle) sunlight in order to reduce glancing reflection 97 of the sunlight (that otherwise would reduce the energy harvesting efficiency of the solar heat collector 430).

Figure 5:
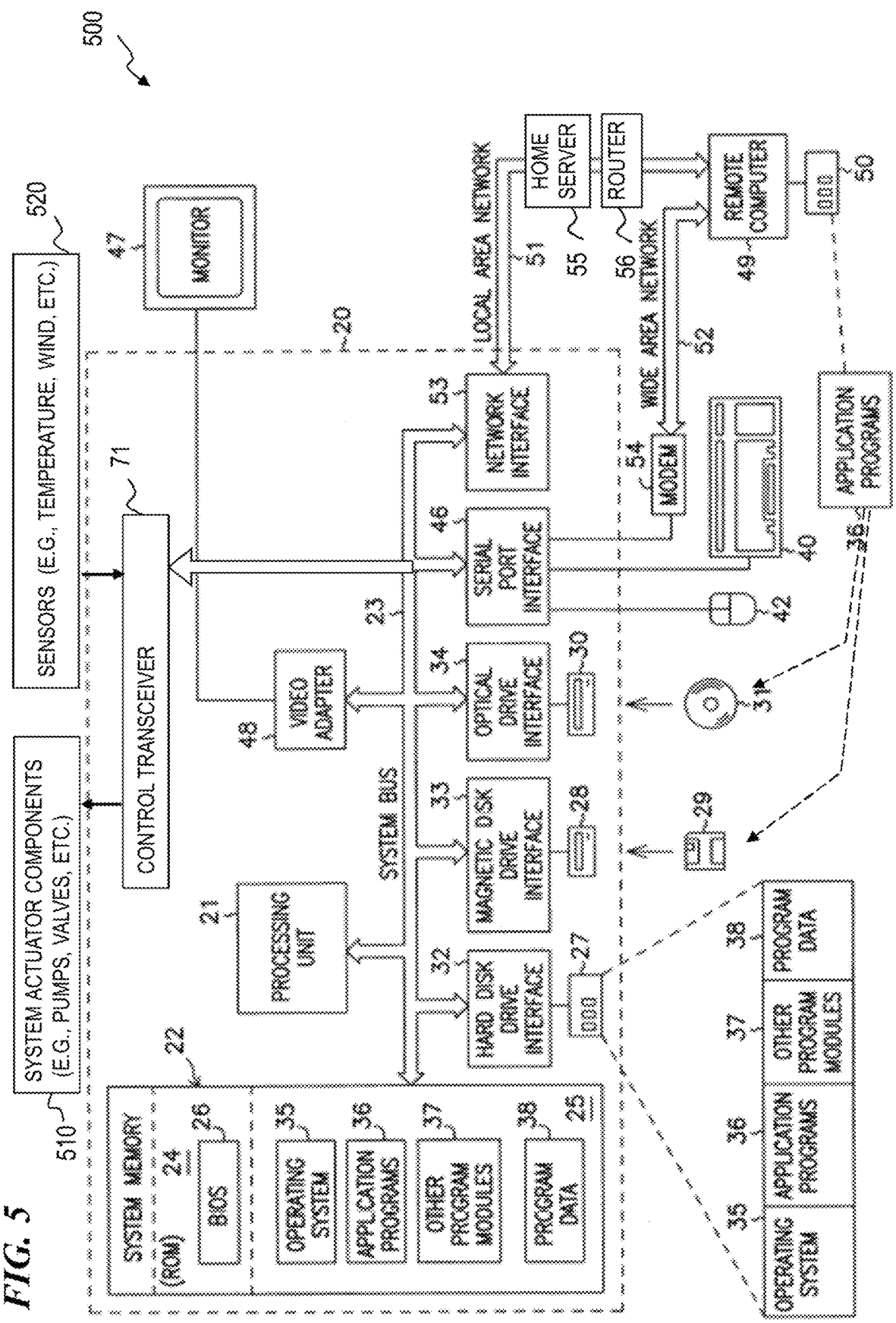
FIG. 5 is a block diagram of solar heat collector controller 500, according to some embodiments of the present invention.

FIG. 5 is a block diagram of solar heat collector controller 500, according to some embodiments of the present invention. In some embodiments, controller 500 includes a computer system implemented using a conventional personal computer 20, which includes processing unit 21, system memory 22, and system bus 23 that couples the system memory 22 and other system components to processing unit 21. System bus 23 may be any of several types, including a memory bus or memory controller, a peripheral bus, and a local bus, and may use any of a variety of bus structures. In some embodiments, system memory 22 includes read-only memory (ROM) 24 and random-access memory (RAM) 25. A basic input/output system (BIOS) program 26, stored in ROM 24, includes the basic routines that transfer information between components of personal computer 20. In some embodiments, ROM 24 also contains start-up routines for the system 201. In some embodiments, computer 20 further includes hard disk drive 27 for reading data from and writing data to, magnetic disk drive 28 for reading from and writing to a removable magnetic disk 29 such as a floppy disk, optical disk drive 30 for reading from and/or writing to a removable optical disk 31 such as a CD-ROM or other optical medium, and USB interface 79 for reading data from and/or writing data to a removable USB storage device 30 such as a USB storage "thumb" drive) such as a FLASH memory stick) other USB-connected storage medium. In some embodiments, hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk drive 28, a removable magnetic disk 29, a removable optical disk 31, and a USB storage drive 39, those skilled in the art will appreciate that other types of computer-readable media which can store data accessible by a computer may also be used in the exemplary operating environment.

In some embodiments, program modules are stored on the hard disk drive 28, magnetic disk 29, optical disk 31, USB ROM 24 and RAM 25. In some embodiments, program modules include operating system 35, one or more application programs 36, other program modules 37, and program data 38. In some embodiments, a user enters commands and information into personal computer 20 through input devices such as a keyboard 40 and a pointing device 42 such as a mouse. In some embodiments, other input devices (not shown) optionally include a microphone, joystick, game pad, scanner, or the like. In some embodiments, these and other input devices are connected to the processing unit 21 through the universal serial bus (USB) interface 79 or serial-port interface 46 coupled to system bus 23; but in other embodiments, they are connected through other interfaces not shown in FIG. 5, such as a parallel port, or a game port. In some embodiments, a monitor 47 or other display device also connects to system bus 23 via an interface such as a video adapter 48. In addition to the monitor 47, some embodiments also include other peripheral output devices (not shown) such as speakers and printers.

In some embodiments, personal computer 20 operates in a networked environment using logical connections to one or more remote computers such as remote computer 49. In some embodiments, remote computer 49 includes another personal computer, a server, a router, a network PC, a peer device, and/or other common network node device. In some embodiments remote computer 49 includes many or all of the components described above in connection with personal computer 20; however, only a storage device 50 is illustrated in FIG. 5. In some embodiments, the logical connections include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53 such as a WIFI wireless connection or ethernet cable interface. When used in a WAN network 52 such as the internet, PC 20 typically includes router 56 or modem 54 or other electronics for establishing communications over network 52. Router 56 or modem 54 may be internal or external to PC 20, and connects to system bus 23 either directly or via serial-port interface 46. In a networked environment, program modules depicted as residing within 20 or portions thereof may be stored in remote storage device 50 or home server 55. Of course, the network connections shown are illustrative, and other ways of establishing a communications link between the computers may be substituted.

In some embodiments, some or all of controller 500 is implemented as an embedded controller and/or other circuitry. In some embodiments, controller 500 includes a plurality of sensors 520 that include, for example, temperature sensors, wind sensors, solar-direction sensors and the like. In some embodiments, controller 500 includes a plurality of system actuator devices 510, such as pumps, valves, solar-collector pointing devices to point the solar collector 110 at angles and/or orientations that more efficiently gather solar energy.

FIG. 6 is a block diagram of solar heat collector controller method 600, according to some embodiments of the present invention. In some embodiments, method 600 includes one or more functional modules (also called software blocks) that include programmed instructions that execute on system 500. In some embodiments, method 600 routine 601 for collecting and storing heat energy, and routine 602 for radiating energy from a CETF and storing the cooling energy.

In some embodiments, routine 601 includes blocks 610-620, including block 610 that moves HETF through solar collector 110 to collect solar energy and measures the temperature of the HETF leaving the solar collector 110. Block 612 measure temperatures in each of a plurality of heat-storage reservoirs (e.g., 122, 132, 142 . . . 152), and at block 613 if the HETF has the lowest temperature (i.e., a lower temperature than any of the heat-storage reservoirs 122, 132, 142 . . . 152), then the HETF is passed back to block 610; otherwise the HETF is moved to block 614. At block 614 the controller 500 controls the pumps and valves to move the HETF to the heat-storage reservoir 122, 132, 142 . . . 152 having the highest temperature that is lower than the temperature of the HETF. Block 616 measure temperatures in each of the others of the plurality of heat-storage reservoirs (e.g., 122, 132, 142 . . . 152) and the temperature of the HETF leaving the heat-storage reservoir that was used by block 614, and at block 618 if the HETF has the lowest temperature (i.e., a lower temperature than any of the heat-storage reservoirs 122, 132, 142 . . . 152), then the HETF is passed back to block 610; otherwise the HETF is moved to block 620. At block 620 the controller 500 controls the pumps and valves to move the HETF to the other of heat-storage reservoir 122, 132, 142 . . . 152 having the highest temperature that is lower than the temperature of the HETF, and control moves back to block 616.

In some embodiments, routine 602 includes blocks 630-640, including block 630 that moves CETF through energy radiator 210 to radiate energy to a selected area of the sky and measures the temperature of the CETF leaving the energy radiator 210. Block 632 measure temperatures in each of a plurality of cooling-energy-storage reservoirs (e.g., 122 (which can also serve as a heat-energy storage reservoir), 232, 242 . . . 252), and at block 633 if the CETF has the highest temperature (i.e., a higher temperature than any of the cooling-energy-storage reservoirs 122, 232, 242 . . . 252), then the CETF is passed back to block 630 to radiate additional energy; otherwise the CETF and control is moved to block 634. At block 634 the controller 500 controls the pumps and valves to move the CETF to the cooling-energy-storage reservoir 122, 232, 242 . . . 252 having the lowest temperature that is higher than the temperature of the CETF. Block 636 measure temperatures in each of the others of the plurality of cooling-energy-storage reservoir 122, 232, 242 . . . 252 and the temperature of the CETF leaving the cooling-energy-storage reservoir that was used by block 634, and at block 638 if the CETF has the highest temperature (i.e., a higher temperature than any of the cooling-energy-storage reservoirs 122, 232, 242 . . . 252), then the CETF is passed back to block 630; otherwise the CETF is moved to block 640. At block 640 the controller 500 controls the pumps and valves to move the CETF to the other of cooling-energy-storage reservoir 122, 232, 242 . . . 252 having the lowest temperature that is higher than the temperature of the CETF, and control moves back to block 636.

In some embodiments, the present invention provides an apparatus 100, 200, or 300 that includes: a solar collector 110 that absorbs solar energy and heats an energy-transfer fluid (ETF); a first plurality of energy-storage cells 160 that are each thermally insulated from one another, wherein the first plurality of energy-storage cells 160 includes a first energy-storage cell 122 and a second energy-storage cell 132; a first pump 115; a first plurality of temperature sensors, wherein the first plurality of temperature sensors includes a first temperature sensor 128 configured to measure a temperature of the first energy-storage cell 122 and a second temperature sensor 138 configured to measure a temperature of the second energy-storage cell 132 and a third temperature sensor 118 configured to measure a temperature of the ETF coming from the solar collector; a first plurality of valves; a controller 500, operatively coupled to the first pump, to the first plurality of temperature sensors, and to the first plurality of valves, wherein the controller 500 controls a flow of the ETF from the solar collector 110 through one or more fluid conduits to the first plurality of energy-storage cells, and wherein, in a first mode, the controller is configured to cause the first pump and the first plurality of valves to:

(a) move ETF from the solar collector first to the first energy-storage cell and later back to the solar collector if the temperature of the ETF coming from the solar collector is greater than the temperature of the first energy-storage cell and the temperature of the ETF coming from the solar collector is less than the temperature of the second energy-storage cell, and (b) move ETF from the solar collector first to the first energy-storage cell and then to the second energy-storage cell if the temperature of the ETF coming from the solar collector is greater than the temperature of the first energy-storage cell and the temperature of the first energy-storage cell is greater than the temperature of the second energy-storage cell, and (c) recirculate ETF in the solar collector if the temperature of the ETF coming from the solar collector is less than the temperature of the first energy-storage cell and the temperature of the ETF coming from the solar collector is less than the temperature of the second energy-storage cell.

Some embodiments of the apparatus further include: a building, wherein the solar collector is mounted to the building and oriented to absorb solar energy, and wherein at least some of the first plurality of energy-storage cells are located at least partially under the building.

Some embodiments of the apparatus further include: a building, wherein the solar collector is mounted to a roof of the building and oriented to absorb solar energy, and wherein the first plurality of energy-storage cells is located under the building, and wherein each respective one of the first plurality of energy-storage cells includes a volume of low-strength concrete having one or more fluid conduits therethrough to convey ETF to transfer energy to and from the respective one of the first plurality of energy-storage cells, and wherein foamed cellular concrete is located between ones of the first plurality of energy-storage cells to at least partially insulate each of the first plurality of energy-storage cells from others of the first plurality of energy-storage cells.

Some embodiments of the apparatus further include: a building, wherein the solar collector is mounted to a roof of the building and oriented to absorb solar energy, and wherein the first plurality of energy-storage cells is located under the building, and wherein each respective one of the first plurality of energy-storage cells is configured as a generally horizontal layer having a horizontal extent that is larger than a vertical extent and includes a volume of low-strength concrete having PEX tubing therethrough to convey ETF to transfer energy to and from the respective one of the first plurality of energy-storage cells, and wherein a generally horizontal layer of foamed cellular concrete is located between ones of the first plurality of energy-storage cells to at least partially insulate each of the first plurality of energy-storage cells from others of the first plurality of energy-storage cells.

Some embodiments of the apparatus further include: a building, wherein the solar collector is mounted to a roof of the building and oriented to absorb solar energy, and wherein the first plurality of energy-storage cells is located under the building, and wherein the first and the second energy-storage cells are each configured as a generally horizontal layer having a horizontal extent that is larger than a vertical extent and includes a volume of low-strength concrete having PEX tubing therethrough to convey ETF to transfer energy to and from the first and the second energy-storage cells, and wherein a generally horizontal layer of foamed cellular concrete is located between the first energy-storage cell and the second energy-storage cell to at least partially insulate the first energy-storage cell from the second energy-storage cell.

Some embodiments of the apparatus further include: an energy radiator 210 that radiates thermal energy to an environment and thereby cools an energy-transfer fluid (ETF); a second plurality of energy-storage cells 260 that are each thermally insulated from one another, wherein the second plurality of energy-storage cells includes a third energy-storage cell and a fourth energy-storage cell; a second pump 215; a second plurality of temperature sensors, wherein the second plurality of temperature sensors includes a fourth temperature sensor configured to measure a temperature of the third energy-storage cell and a fifth temperature sensor configured to measure a temperature of the fourth energy-storage cell and a sixth temperature sensor configured to measure a temperature of the ETF coming from the energy radiator; a second plurality of valves; wherein the controller is operatively coupled to the second pump, to the second plurality of temperature sensors, and to the second plurality of valves, wherein the controller controls a flow of the ETF from the energy radiator through one or more fluid conduits to the second plurality of energy-storage cells, and wherein, in a second mode, the controller is configured to cause the second pump and the second plurality of valves to:

(d) move ETF from the energy radiator first to the third energy-storage cell and later back to the energy radiator if the temperature of the ETF coming from the energy radiator is less than the temperature of the third energy-storage cell and the temperature of the ETF coming from the energy radiator is greater than the temperature of the fourth energy-storage cell, and (e) move ETF from the energy radiator first to the third energy-storage cell and then to the fourth energy-storage cell if the temperature of the ETF coming from the energy radiator is less than the temperature of the third energy-storage cell and the temperature of the third energy-storage cell is less than the temperature of the fourth energy-storage cell, and (f) recirculate ETF in the energy radiator if the temperature of the ETF coming from the energy radiator is greater than the temperature of the third energy-storage cell and the temperature of the ETF coming from the energy radiator is greater than the temperature of the fourth energy-storage cell.

Some embodiments of the apparatus further include: a building, wherein the energy radiator is mounted to the building and oriented to radiate energy to a region of sky, and wherein at least some of the second plurality of energy-storage cells are located at least partially under the building.

Some embodiments of the apparatus further include: a building, wherein the energy radiator is mounted to the building and oriented to radiate energy to a region of sky, and wherein the second plurality of energy-storage cells is located under the building, and wherein each respective one of the second plurality of energy-storage cells includes a volume of low-strength concrete having one or more fluid conduits therethrough to convey ETF to transfer energy to and from the respective one of the second plurality of energy-storage cells, and wherein foamed cellular concrete is located between ones of the second plurality of energy-storage cells to at least partially insulate each of the second plurality of energy-storage cells from others of the second plurality of energy-storage cells.

Some embodiments of the apparatus further include: a building, wherein the energy radiator is mounted to the building and oriented to radiate energy to a region of sky, and wherein the second plurality of energy-storage cells is located under the building, and wherein each respective one of the second plurality of energy-storage cells is configured as a generally horizontal layer having a horizontal extent that is larger than a vertical extent and includes a volume of low-strength concrete having PEX tubing therethrough to convey ETF to transfer energy to and from the respective one of the second plurality of energy-storage cells, and wherein a generally horizontal layer of foamed cellular concrete is located between ones of the second plurality of energy-storage cells to at least partially insulate each of the second plurality of energy-storage cells from others of the second plurality of energy-storage cells.

Some embodiments of the apparatus further include: a building, wherein the energy radiator is mounted to the building and oriented to radiate energy to a region of sky, and wherein the second plurality of energy-storage cells is located under the building, and wherein the third and the fourth energy-storage cells are each configured as a generally horizontal layer having a horizontal extent that is larger than a vertical extent and includes a volume of low-strength concrete having PEX tubing therethrough to convey ETF to transfer energy to and from the third and the fourth energy-storage cells, and wherein a generally horizontal layer of foamed cellular concrete is located between the third energy-storage cell and the fourth energy-storage cell to at least partially insulate the third energy-storage cell from the fourth energy-storage cell.

In some embodiments, the present invention provides a method that includes: providing a solar collector that absorbs solar energy and heats an energy-transfer fluid (ETF), a first plurality of energy-storage cells that are each thermally insulated from one another, wherein the first plurality of energy-storage cells includes a first energy-storage cell and a second energy-storage cell; pumping the ETF from the solar collector to the first plurality of energy-storage cells; measuring a temperature of the first energy-storage cell and a temperature of the second energy-storage cell and a temperature of the ETF coming from the solar collector; controlling a flow of the ETF from the solar collector through one or more fluid conduits to the first plurality of energy-storage cells, and wherein, in a first mode, the controlling controls:

(a) moving ETF from the solar collector first to the first energy-storage cell and later back to the solar collector if the temperature of the ETF coming from the solar collector is greater than the temperature of the first energy-storage cell and the temperature of the ETF coming from the solar collector is less than the temperature of the second energy-storage cell, and (b) moving ETF from the solar collector first to the first energy-storage cell and then to the second energy-storage cell if the temperature of the ETF coming from the solar collector is greater than the temperature of the first energy-storage cell and the temperature of the first energy-storage cell is greater than the temperature of the second energy-storage cell, and (c) recirculating ETF in the solar collector if the temperature of the ETF coming from the solar collector is less than the temperature of the first energy-storage cell and the temperature of the ETF coming from the solar collector is less than the temperature of the second energy-storage cell.

Some embodiments of the method further include: mounting the solar collector to a building; orienting the solar collector to absorb solar energy; and positioning at least some of the first plurality of energy-storage cells at least partially under the building.

Some embodiments of the method further include: mounting the solar collector to a building; orienting the solar collector to absorb solar energy; locating at least some of the first plurality of energy-storage cells at least partially under the building, wherein each respective one of the first plurality of energy-storage cells includes a volume of low-strength concrete having one or more fluid conduits therethrough to convey ETF to transfer energy to and from the respective one of the first plurality of energy-storage cells; and locating foamed cellular concrete between ones of the first plurality of energy-storage cells to at least partially insulate each of the first plurality of energy-storage cells from others of the first plurality of energy-storage cells.

Some embodiments of the method further include: mounting the solar collector to a building; orienting the solar collector to absorb solar energy; locating at least some of the first plurality of energy-storage cells at least partially under the building, wherein each respective one of the first plurality of energy-storage cells is configured as a generally horizontal layer having a horizontal extent that is larger than a vertical extent and includes a volume of low-strength concrete having PEX tubing therethrough to convey ETF to transfer energy to and from the respective one of the first plurality of energy-storage cells; and locating a generally horizontal layer of foamed cellular concrete between ones of the first plurality of energy-storage cells to at least partially insulate each of the first plurality of energy-storage cells from others of the first plurality of energy-storage cells.

Some embodiments of the method further include: mounting the solar collector to a building; orienting the solar collector to absorb solar energy; locating at least some of the first plurality of energy-storage cells at least partially under the building, wherein the first and the second energy-storage cells are each configured as a generally horizontal layer having a horizontal extent that is larger than a vertical extent and includes a volume of low-strength concrete having PEX tubing therethrough to convey ETF to transfer energy to and from the first and the second energy-storage cells, and wherein a generally horizontal layer of foamed cellular concrete is located between the first energy-storage cell and the second energy-storage cell to at least partially insulate the first energy-storage cell from the second energy-storage cell.

Some embodiments of the method further include: providing an energy radiator that radiates thermal energy to an environment and thereby cools an energy-transfer fluid (ETF), and a second plurality of energy-storage cells that are each thermally insulated from one another, wherein the second plurality of energy-storage cells includes a third energy-storage cell and a fourth energy-storage cell; pumping the ETF from the energy radiator to the second plurality of energy-storage cells; measuring a temperature of the third energy-storage cell and a temperature of the fourth energy-storage cell and a temperature of the ETF coming from the energy radiator; controlling a flow of the ETF from the energy radiator through one or more fluid conduits to the second plurality of energy-storage cells, and wherein, in a second mode, the controlling controls:

(d) moving ETF from the energy radiator first to the third energy-storage cell and later back to the energy radiator if the temperature of the ETF coming from the energy radiator is less than the temperature of the third energy-storage cell and the temperature of the ETF coming from the energy radiator is greater than the temperature of the fourth energy-storage cell, and (e) moving ETF from the energy radiator first to the third energy-storage cell and then to the fourth energy-storage cell if the temperature of the ETF coming from the energy radiator is less than the temperature of the first energy-storage cell and the temperature of the third energy-storage cell is less than the temperature of the fourth energy-storage cell, and (f) recirculating ETF in the energy radiator if the temperature of the ETF coming from the solar collector is greater than the temperature of the third energy-storage cell and the temperature of the ETF coming from the energy radiator is greater than the temperature of the fourth energy-storage cell.

Some embodiments of the method further include: mounting the energy radiator to a building; orienting the energy radiator to radiate energy to a region of sky; locating at least some of the second plurality of energy-storage cells at least partially under the building, wherein the energy radiator is mounted to the building and oriented to radiate energy to a region of sky, and wherein at least some of the second plurality of energy-storage cells are located at least partially under the building.

Some embodiments of the method further include: mounting the energy radiator to a building; orienting the energy radiator to radiate energy to a region of sky; locating at least some of the second plurality of energy-storage cells at least partially under the building, and wherein each respective one of the second plurality of energy-storage cells includes a volume of low-strength concrete having one or more fluid conduits therethrough to convey ETF to transfer energy to and from the respective one of the second plurality of energy-storage cells, and wherein foamed cellular concrete is located between ones of the second plurality of energy-storage cells to at least partially insulate each of the second plurality of energy-storage cells from others of the second plurality of energy-storage cells.

Some embodiments of the method further include: mounting the energy radiator to a building; orienting the energy radiator to radiate energy to a region of sky; locating at least some of the second plurality of energy-storage cells at least partially under the building, and wherein each respective one of the second plurality of energy-storage cells is configured as a generally horizontal layer having a horizontal extent that is larger than a vertical extent and includes a volume of low-strength concrete having PEX tubing therethrough to convey ETF to transfer energy to and from the respective one of the second plurality of energy-storage cells, and wherein a generally horizontal layer of foamed cellular concrete is located between ones of the second plurality of energy-storage cells to at least partially insulate each of the second plurality of energy-storage cells from others of the second plurality of energy-storage cells.

Some embodiments of the method further include: mounting the energy radiator to a building; orienting the energy radiator to radiate energy to a region of sky; locating at least some of the second plurality of energy-storage cells at least partially under the building, and wherein the third and the fourth energy-storage cells are each configured as a generally horizontal layer having a horizontal extent that is larger than a vertical extent and includes a volume of low-strength concrete having PEX tubing therethrough to convey ETF to transfer energy to and from the third and the fourth energy-storage cells, and wherein a generally horizontal layer of foamed cellular concrete is located between the third energy-storage cell and the fourth energy-storage cell to at least partially insulate the third energy-storage cell from the fourth energy-storage cell.

In some embodiments, the present invention provides an apparatus that includes: a solar collector that absorbs solar energy and heats an energy-transfer fluid (ETF), a first plurality of energy-storage cells that are each thermally insulated from one another, wherein the first plurality of energy-storage cells includes a first energy-storage cell and a second energy-storage cell; means for pumping the ETF from the solar collector to the first plurality of energy-storage cells; means for measuring a temperature of the first energy-storage cell and a temperature of the second energy-storage cell and a temperature of the ETF coming from the solar collector; means for controlling a flow of the ETF from the solar collector through one or more fluid conduits to the first plurality of energy-storage cells, and wherein, in a first mode, the controlling controls:

(a) means for moving ETF from the solar collector first to the first energy-storage cell and later back to the solar collector if the temperature of the ETF coming from the solar collector is greater than the temperature of the first energy-storage cell and the temperature of the ETF coming from the solar collector is less than the temperature of the second energy-storage cell, and (b) means for moving ETF from the solar collector first to the first energy-storage cell and then to the second energy-storage cell if the temperature of the ETF coming from the solar collector is greater than the temperature of the first energy-storage cell and the temperature of the first energy-storage cell is greater than the temperature of the second energy-storage cell, and (c) means for recirculating ETF in the solar collector if the temperature of the ETF coming from the solar collector is less than the temperature of the first energy-storage cell and the temperature of the ETF coming from the solar collector is less than the temperature of the second energy-storage cell.

Some embodiments of the apparatus further include: means for mounting the solar collector to a building; and means for orienting the solar collector to absorb solar energy, wherein at least some of the first plurality of energy-storage cells are located at least partially under the building.

Some embodiments of the apparatus further include: means for mounting the solar collector to a building; means for orienting the solar collector to absorb solar energy; wherein at least some of the first plurality of energy-storage cells are located at least partially under the building, wherein each respective one of the first plurality of energy-storage cells includes a volume of low-strength concrete having one or more fluid conduits therethrough to convey ETF to transfer energy to and from the respective one of the first plurality of energy-storage cells; and means for insulating located between ones of the first plurality of energy-storage cells to at least partially insulate each of the first plurality of energy-storage cells from others of the first plurality of energy-storage cells.

Some embodiments of the apparatus further include: means for mounting the solar collector to a building; means for orienting the solar collector to absorb solar energy; wherein at least some of the first plurality of energy-storage cells are located at least partially under the building, wherein each respective one of the first plurality of energy-storage cells is configured as a generally horizontal layer having a horizontal extent that is larger than a vertical extent and includes a volume of low-strength concrete having PEX tubing therethrough to convey ETF to transfer energy to and from the respective one of the first plurality of energy-storage cells; and means for insulating located between ones of the first plurality of energy-storage cells to at least partially insulate each of the first plurality of energy-storage cells from others of the first plurality of energy-storage cells.

Some embodiments of the apparatus further include: means for mounting the solar collector to a building; means for orienting the solar collector to absorb solar energy, wherein at least some of the first plurality of energy-storage cells are located at least partially under the building, wherein the first and the second energy-storage cells are each configured as a generally horizontal layer having a horizontal extent that is larger than a vertical extent and includes a volume of low-strength concrete having PEX tubing therethrough to convey ETF to transfer energy to and from the first and the second energy-storage cells, and means for insulating located between the first energy-storage cell and the second energy-storage cell to at least partially insulate the first energy-storage cell from the second energy-storage cell.

Some embodiments of the apparatus further include: an energy radiator that radiates thermal energy to an environment and thereby cools an energy-transfer fluid (ETF), and a second plurality of energy-storage cells that are each thermally insulated from one another, wherein the second plurality of energy-storage cells includes a third energy-storage cell and a fourth energy-storage cell; means for pumping the ETF from the energy radiator to the second plurality of energy-storage cells; means for measuring a temperature of the third energy-storage cell and a temperature of the fourth energy-storage cell and a temperature of the ETF coming from the energy radiator; means for controlling a flow of the ETF from the energy radiator through one or more fluid conduits to the second plurality of energy-storage cells, and wherein, in a second mode, the controlling controls:

(d) means for moving ETF from the energy radiator first to the third energy-storage cell and later back to the energy radiator if the temperature of the ETF coming from the energy radiator is less than the temperature of the third energy-storage cell and the temperature of the ETF coming from the energy radiator is greater than the temperature of the fourth energy-storage cell, and (e) means for moving ETF from the energy radiator first to the third energy-storage cell and then to the fourth energy-storage cell if the temperature of the ETF coming from the energy radiator is less than the temperature of the first energy-storage cell and the temperature of the third energy-storage cell is less than the temperature of the fourth energy-storage cell, and (f) means for recirculating ETF in the energy radiator if the temperature of the ETF coming from the solar collector is greater than the temperature of the third energy-storage cell and the temperature of the ETF coming from the energy radiator is greater than the temperature of the fourth energy-storage cell.

Some embodiments of the apparatus further include: means for mounting the energy radiator to a building; and means for orienting the energy radiator to radiate energy to a region of sky, wherein at least some of the second plurality of energy-storage cells are located at least partially under the building, wherein the energy radiator is mounted to the building and oriented to radiate energy to a region of sky, and wherein at least some of the second plurality of energy-storage cells are located at least partially under the building.

Some embodiments of the apparatus further include: means for mounting the energy radiator to a building; means for orienting the energy radiator to radiate energy to a region of sky, wherein at least some of the second plurality of energy-storage cells are located at least partially under the building, and wherein each respective one of the second plurality of energy-storage cells includes a volume of low-strength concrete having one or more fluid conduits therethrough to convey ETF to transfer energy to and from the respective one of the second plurality of energy-storage cells; and means for insulating located between ones of the first plurality of energy-storage cells to at least partially insulate each of the second plurality of energy-storage cells from others of the second plurality of energy-storage cells.

Some embodiments of the apparatus further include: means for mounting the energy radiator to a building; means for orienting the energy radiator to radiate energy to a region of sky, wherein at least some of the second plurality of energy-storage cells are located at least partially under the building, and wherein each respective one of the second plurality of energy-storage cells is configured as a generally horizontal layer having a horizontal extent that is larger than a vertical extent and includes a volume of low-strength concrete having PEX tubing therethrough to convey ETF to transfer energy to and from the respective one of the second plurality of energy-storage cells; and means for insulating located between ones of the second plurality of energy-storage cells to at least partially insulate each of the second plurality of energy-storage cells from others of the second plurality of energy-storage cells.

Some embodiments of the apparatus further include: means for mounting the energy radiator to a building; means for orienting the energy radiator to radiate energy to a region of sky, wherein at least some of the second plurality of energy-storage cells are located at least partially under the building, and wherein the third and the fourth energy-storage cells are each configured as a generally horizontal layer having a horizontal extent that is larger than a vertical extent and includes a volume of low-strength concrete having PEX tubing therethrough to convey ETF to transfer energy to and from the third and the fourth energy-storage cells; and means for insulating located between the third energy-storage cell and the fourth energy-storage cell to at least partially insulate the third energy-storage cell from the fourth energy-storage cell.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:
1. An apparatus comprising:
a solar collector mounted to a building that absorbs solar energy and that heats a liquid heating-energy-transfer fluid (HETF);
a first plurality of energy-storage cells that form a foundation of a building, wherein each one of the first plurality of energy-storage cells is configured as a generally horizontal layer having a horizontal extent that is larger than a vertical extent, and that are each thermally insulated from one another by a generally horizontal layer of foamed cellular concrete on both a top face and a bottom face of each of the first plurality of energy-storage cells, wherein the first plurality of energy-storage cells includes a first energy-storage cell and a second energy-storage cell;
a first pump;
a first plurality of temperature sensors, wherein the first plurality of temperature sensors includes a first temperature sensor configured to measure a temperature of the first energy-storage cell and a second temperature sensor configured to measure a temperature of the second energy-storage cell and a third temperature sensor configured to measure a temperature of the HETF coming from the solar collector;
a first plurality of valves;
a controller, operatively coupled to the first pump, to the first plurality of temperature sensors, and to the first plurality of valves, wherein the controller controls a flow of the HETF from the solar collector through one or more fluid conduits to the first plurality of energy-storage cells, and wherein, in a first mode, the controller is configured to cause the first pump and the first plurality of valves to:
  move the HETF from the solar collector first to the first energy-storage cell and later back to the solar collector if the temperature of the HETF coming from the solar collector is greater than the temperature of the first energy-storage cell and the temperature of the HETF coming from the solar collector is less than the temperature of the second energy-storage cell, and
  move the HETF from the solar collector first to the first energy-storage cell and then to the second energy-storage cell if the temperature of the HETF coming from the solar collector is greater than the temperature of the first energy-storage cell and the temperature of the first energy-storage cell is greater than the temperature of the second energy-storage cell, and
  recirculate the HETF in the solar collector if the temperature of the HETF coming from the solar collector is less than the temperature of the first energy-storage cell and the temperature of the HETF coming from the solar collector is less than the temperature of the second energy-storage cell.
2. The apparatus of claim 1, further comprising:
the building, wherein the solar collector is mounted to a roof of the building and includes a plurality of purlins that each have an upper surface that has a surface coating or material that minimizes energy collection and a lower has a surface coating or material that maximizes energy collection, wherein the plurality of purlins are oriented to absorb less solar energy from high-angle summer sunlight and more solar energy from low-angle winter sunlight.

3. The apparatus of claim 1, further comprising:
a domestic bathing and drinking water system, wherein highest-temperature HETF is used to heat the domestic bathing and drinking water system, and
wherein each respective one of the first plurality of energy-storage cells includes a volume of concrete having one or more fluid conduits therethrough to convey HETF to transfer energy to and from the respective one of the first plurality of energy-storage cells.

4. The apparatus of claim 1, further comprising:
the building,
wherein the solar collector is mounted to a roof of the building and includes a plurality of purlins that are oriented to absorb less solar energy from high-angle summer sunlight and more solar energy from low-angle winter sunlight, and
wherein each respective one of the first plurality of energy-storage cells includes a volume of concrete having PEX tubing therethrough to convey HETF to transfer energy to and from the respective one of the first plurality of energy-storage cells.

5. The apparatus of claim 1, further comprising:
the building,
wherein the solar collector is mounted to a roof of the building and includes a plurality of purlins that are oriented to absorb less solar energy from high-angle summer sunlight and more solar energy from low-angle winter sunlight, and
wherein a bottom-most one of the first plurality of energy-storage cells is located directly on ground under the building with no insulation layer placed below the bottom-most one of the first plurality of energy-storage cells, and
wherein the first and the second energy-storage cells each includes a volume of concrete having PEX tubing therethrough to convey the HETF to transfer energy to and from the first and the second energy-storage cells.

6. The apparatus of claim 1, further comprising:
an energy radiator that is mounted to a roof of the building, and that is oriented such that the energy radiator radiates thermal energy to a region of the sky and thereby cools a liquid cooling-energy-transfer fluid (CETF);
a second plurality of energy-storage cells wherein each one of the second plurality of energy-storage cells is configured as a generally horizontal layer having a horizontal extent that is larger than a vertical extent, and that are each thermally insulated from one another by a generally horizontal layer of foamed cellular concrete against both a top face and a bottom face of each of the second plurality of energy-storage cells, wherein the second plurality of energy-storage cells includes a third energy-storage cell and a fourth energy-storage cell;
a second pump;
a second plurality of temperature sensors, wherein the second plurality of temperature sensors includes a fourth temperature sensor configured to measure a temperature of the third energy-storage cell and a fifth temperature sensor configured to measure a temperature of the fourth energy-storage cell and a sixth temperature sensor configured to measure a temperature of the CETF coming from the energy radiator;
a second plurality of valves;
wherein the controller is operatively coupled to the second pump, to the second plurality of temperature sensors, and to the second plurality of valves, wherein the controller controls a flow of the CETF from the energy radiator through one or more fluid conduits to the second plurality of energy-storage cells, and wherein, in a second mode, the controller is configured to cause the second pump and the second plurality of valves to:
move the CETF from the energy radiator first to the third energy-storage cell and later back to the energy radiator if the temperature of the CETF coming from the energy radiator is less than the temperature of the third energy-storage cell and the temperature of the CETF coming from the energy radiator is greater than the temperature of the fourth energy-storage cell, and
move the CETF from the energy radiator first to the third energy-storage cell and then to the fourth energy-storage cell if the temperature of the CETF coming from the energy radiator is less than the temperature of the third energy-storage cell and the temperature of the third energy-storage cell is less than the temperature of the fourth energy-storage cell, and
recirculate the CETF in the energy radiator if the temperature of the CETF coming from the energy radiator is greater than the temperature of the third energy-storage cell and the temperature of the CETF coming from the energy radiator is greater than the temperature of the fourth energy-storage cell.

7. The apparatus of claim 6, wherein a bottom-most one of the second plurality of energy-storage cells is located directly on ground under the building with no insulation layer placed below the bottom-most one of the second plurality of energy-storage cells.

8. The apparatus of claim 6, further comprising:
the building, wherein the second plurality of energy-storage cells is located at least partially under the building, and wherein each respective one of the second plurality of energy-storage cells includes a volume of concrete having one or more fluid conduits therethrough to convey the CETF to transfer energy to and from the respective one of the second plurality of energy-storage cells.

9. The apparatus of claim 6, wherein the second plurality of energy-storage cells is located under the building, and wherein each respective one of the second plurality of energy-storage cells is configured as a generally horizontal layer having a horizontal extent that is larger than a vertical extent and includes a volume of concrete having PEX tubing therethrough to convey the CETF to transfer energy to and from the respective one of the second plurality of energy-storage cells.

10. The apparatus of claim 6, wherein a bottom-most one of the second plurality of energy-storage cells is located directly on ground under the building with no insulation layer placed below the bottom-most one of the second plurality of energy-storage cells, and wherein the third and the fourth energy-storage cells are each configured as a generally horizontal layer having a horizontal extent that is larger than a vertical extent and includes a volume of concrete having PEX tubing therethrough to convey the CETF to transfer energy to and from the third and the fourth energy-storage cells.

11. A method comprising:
mounting a solar collector to a building and orienting the solar collector to absorb solar energy and heat a liquid heating-energy-transfer fluid (HETF);

providing a first plurality of energy-storage cells that form a foundation of a building, wherein each energy-storage cell is configured as a generally horizontal layer having a horizontal extent that is larger than a vertical extent, and that are each thermally insulated from one another by a generally horizontal layer of foamed cellular concrete on both a top face and a bottom face of each of the first plurality of energy-storage cells wherein the first plurality of energy-storage cells includes a first energy-storage cell and a second energy-storage cell;

pumping the HETF from the solar collector to the first plurality of energy-storage cells;

measuring a temperature of the first energy-storage cell and a temperature of the second energy-storage cell and a temperature of the HETF coming from the solar collector;

controlling a flow of the HETF from the solar collector through one or more fluid conduits to the first plurality of energy-storage cells, and wherein, in a first mode, the controlling controls:

moving HETF from the solar collector first to the first energy-storage cell and later back to the solar collector if the temperature of the HETF coming from the solar collector is greater than the temperature of the first energy-storage cell and the temperature of the HETF coming from the solar collector is less than the temperature of the second energy-storage cell, and moving HETF from the solar collector first to the first energy-storage cell and then to the second energy-storage cell if the temperature of the HETF coming from the solar collector is greater than the temperature of the first energy-storage cell and the temperature of the first energy-storage cell is greater than the temperature of the second energy-storage cell, and recirculating HETF in the solar collector if the temperature of the HETF coming from the solar collector is less than the temperature of the first energy-storage cell and the temperature of the HETF coming from the solar collector is less than the temperature of the second energy-storage cell.

12. The method of claim 11, further comprising:
positioning a bottom-most one of the first plurality of energy-storage cells directly on ground under the building with no insulation layer placed below the bottom-most one of the first plurality of energy-storage cells.

13. The method of claim 11, further comprising:
locating at least some of the first plurality of energy-storage cells at least partially under the building, wherein each respective one of the first plurality of energy-storage cells includes a volume of concrete having one or more fluid conduits therethrough to convey the HETF to transfer energy to and from the respective one of the first plurality of energy-storage cells.

14. The method of claim 11,
wherein each respective one of the first plurality of energy-storage cells includes a volume of concrete having PEX tubing therethrough to convey the HETF to transfer energy to and from the respective one of the first plurality of energy-storage cells.

15. The method of claim 11, further comprising:
locating a bottom-most one of the first plurality of energy-storage cells directly on ground under the building with no insulation layer placed below the bottom-most one of the first plurality of energy-storage cells, wherein the first and the second energy-storage cells each includes a volume of concrete having PEX tubing therethrough to convey the HETF to transfer energy to and from the first and the second energy-storage cells.

16. The method of claim 11, further comprising:
mounting an energy radiator to a roof of the building, and orienting the energy radiator to radiate thermal energy to a region of the sky and thereby cool a liquid cooling-energy-transfer fluid (CETF);

a second plurality of energy-storage cells wherein each one of the second plurality of energy-storage cells is configured as a generally horizontal layer having a horizontal extent that is larger than a vertical extent, and that are each thermally insulated from one another by a generally horizontal layer of foamed cellular concrete against both a top face and a bottom face of each of the second plurality of energy-storage cells, wherein the second plurality of energy-storage cells includes a third energy-storage cell and a fourth energy-storage cell;

pumping the CETF from the energy radiator to the second plurality of energy-storage cells;

measuring a temperature of the third energy-storage cell and a temperature of the fourth energy-storage cell and a temperature of the CETF coming from the energy radiator;

controlling a flow of the CETF from the energy radiator through one or more fluid conduits to the second plurality of energy-storage cells, and wherein, in a second mode, the controlling controls:

moving the CETF from the energy radiator first to the third energy-storage cell and later back to the energy radiator if the temperature of the CETF coming from the energy radiator is less than the temperature of the third energy-storage cell and the temperature of the CETF coming from the energy radiator is greater than the temperature of the fourth energy-storage cell, and moving the CETF from the energy radiator first to the third energy-storage cell and then to the fourth energy-storage cell if the temperature of the CETF coming from the energy radiator is less than the temperature of the first energy-storage cell and the temperature of the third energy-storage cell is less than the temperature of the fourth energy-storage cell, and recirculating the CETF in the energy radiator if the temperature of the CETF coming from the solar collector is greater than the temperature of the third energy-storage cell and the temperature of the CETF coming from the energy radiator is greater than the temperature of the fourth energy-storage cell.

17. The method of claim 16, further comprising:
locating at least some of the second plurality of energy-storage cells at least partially under the building, wherein the energy radiator is mounted to the building and oriented to radiate energy to a region of sky.

18. The method of claim 16, further comprising:
locating at least some of the second plurality of energy-storage cells at least partially under the building, and wherein each respective one of the second plurality of energy-storage cells includes a volume of concrete having one or more fluid conduits therethrough to convey CETF to transfer energy to and from the respective one of the second plurality of energy-storage cells.

19. The method of claim 16, further comprising:
locating a bottom-most one of the second plurality of energy-storage cells directly on ground under the building with no insulation layer placed below the bottom-most one of the second plurality of energy-storage cells, wherein each respective one of the second plurality of energy-storage cells is configured as a generally horizontal layer having a horizontal extent that is larger than a vertical extent and includes a volume of concrete having PEX tubing therethrough to convey CETF to transfer energy to and from the respective one of the second plurality of energy-storage cells.

20. The method of claim 16, further comprising:
locating a bottom-most one of the second plurality of energy-storage cells directly on ground under the building with no insulation layer placed below the bottom-most one of the second plurality of energy-storage cells.

21. An apparatus comprising:
a solar collector mounted to a building that absorbs solar energy and heats a liquid heat-energy-transfer fluid (HETF),
a first plurality of energy-storage cells that form a foundation of a building, wherein each energy-storage cell is configured as a generally horizontal layer having a horizontal extent that is larger than a vertical extent, and that are each thermally insulated from one another by a generally horizontal layer of foamed cellular concrete on both a top face and a bottom face of each of the first plurality of energy-storage cells, wherein the first plurality of energy-storage cells includes a first energy-storage cell and a second energy-storage cell;
means for pumping the liquid HETF from the solar collector to the first plurality of energy-storage cells;
means for measuring a temperature of the first energy-storage cell and a temperature of the second energy-storage cell and a temperature of the HETF coming from the solar collector; and
means for controlling a flow of the HETF from the solar collector through one or more fluid conduits to the first plurality of energy-storage cells, and wherein, in a first mode, the means for controlling controls:
  moving the HETF from the solar collector first to the first energy-storage cell and later back to the solar collector if the temperature of the HETF coming from the solar collector is greater than the temperature of the first energy-storage cell and the temperature of the HETF coming from the solar collector is less than the temperature of the second energy-storage cell, and
  moving the HETF from the solar collector first to the first energy-storage cell and then to the second energy-storage cell if the temperature of the HETF coming from the solar collector is greater than the temperature of the first energy-storage cell and the temperature of the first energy-storage cell is greater than the temperature of the second energy-storage cell, and
  recirculating the HETF in the solar collector if the temperature of the HETF coming from the solar collector is less than the temperature of the first energy-storage cell and the temperature of the HETF coming from the solar collector is less than the temperature of the second energy-storage cell.

22. The apparatus of claim 21, further comprising:
the building; and
means for absorbing less solar energy from high-angle summer sunlight and more solar energy from low-angle winter sunlight by the solar collector,
wherein the solar collector is mounted to a roof of the building.

23. The apparatus of claim 21, further comprising:
means for absorbing less solar energy from high-angle summer sunlight and more solar energy from low-angle winter sunlight by the solar collector;
the building, wherein each respective one of the first plurality of energy-storage cells includes a volume of concrete having one or more fluid conduits therethrough to convey the HETF to transfer energy to and from the respective one of the first plurality of energy-storage cells.

24. The apparatus of claim 21, further comprising:
means for absorbing less solar energy from high-angle summer sunlight and more solar energy from low-angle winter sunlight by the solar collector;
wherein a bottom-most one of the first plurality of energy-storage cells is located directly on ground under the building with no insulation layer placed below the bottom-most one of the first plurality of energy-storage cells, wherein each respective one of the first plurality of energy-storage cells includes a volume of concrete having PEX tubing therethrough to convey the HETF to transfer energy to and from the respective one of the first plurality of energy-storage cells.

25. The apparatus of claim 21, further comprising:
the building;
wherein the first and the second energy-storage cells each includes a volume of concrete having PEX tubing therethrough to convey the HETF to transfer energy to and from the first and the second energy-storage cells.

26. The apparatus of claim 21, further comprising:
an energy radiator that is mounted to a roof of the building, and that is oriented such that the energy radiator radiates thermal energy to a region of the sky and thereby cools a liquid cooling energy-transfer fluid (CETF);
a second plurality of energy-storage cells, wherein each one of the second plurality of energy-storage cells is configured as a generally horizontal layer having a horizontal extent that is larger than a vertical extent, and that are each thermally insulated from one another by a generally horizontal layer of foamed cellular concrete on both a top face and a bottom face of each of the second plurality of energy-storage cells, wherein the second plurality of energy-storage cells includes a third energy-storage cell and a fourth energy-storage cell;
means for pumping the CETF from the energy radiator to the second plurality of energy-storage cells;
means for measuring a temperature of the third energy-storage cell and a temperature of the fourth energy-storage cell and a temperature of the CETF coming from the energy radiator;
means for controlling a flow of the CETF from the energy radiator through one or more fluid conduits to the second plurality of energy-storage cells, and wherein, in a second mode, the means for controlling controls:
  moving the CETF from the energy radiator first to the third energy-storage cell and later back to the energy radiator if the temperature of the CETF coming from the energy radiator is less than the temperature of the third energy-storage cell and the temperature of the CETF coming from the energy radiator is greater than the temperature of the fourth energy-storage cell,
  moving the CETF from the energy radiator first to the third energy-storage cell and then to the fourth energy-storage cell if the temperature of the CETF coming from the energy radiator is less than the temperature of the first energy-storage cell and the temperature of the third energy-storage cell is less than the temperature of the fourth energy-storage cell, and recirculating the CETF in the energy radiator if the temperature of the CETF coming from the solar collector is greater than the temperature of the third energy-storage cell and the temperature of the CETF coming from the energy radiator is greater than the temperature of the fourth energy-storage cell.

27. The apparatus of claim 26,
wherein a bottom-most one of the second plurality of energy-storage cells is located directly on ground under the building with no insulation layer placed below the bottom-most one of the second plurality of energy-storage cells, wherein the energy radiator is mounted to the roof of the building and oriented to radiate energy to a region of sky.

28. The apparatus of claim 26,
wherein a bottom-most one of the second plurality of energy-storage cells is located directly on ground under the building with no insulation layer placed below the bottom-most one of the second plurality of energy-storage cells, and wherein each respective one of the second plurality of energy-storage cells includes a volume of concrete having one or more fluid conduits therethrough to convey CETF to transfer energy to and from the respective one of the second plurality of energy-storage cells.

29. The apparatus of claim 26,
wherein at least some of the second plurality of energy-storage cells are located at least partially under the building, and wherein each respective one of the second plurality of energy-storage cells is configured as a generally horizontal layer having a horizontal extent that is larger than a vertical extent and includes a volume of concrete having PEX tubing therethrough to convey the CETF to transfer energy to and from the respective one of the second plurality of energy-storage cells.

30. The apparatus of claim 26,
wherein a bottom-most one of the second plurality of energy-storage cells is located directly on ground under the building with no insulation layer placed below the bottom-most one of the second plurality of energy-storage cells, and wherein the third and the fourth energy-storage cells are each configured as a generally horizontal layer having a horizontal extent that is larger than a vertical extent and includes a volume of concrete having PEX tubing therethrough to convey the CETF to transfer energy to and from the third and the fourth energy-storage cells.

* * * * *